(12) United States Patent
Yoshizumi et al.

(10) Patent No.: US 7,968,242 B2
(45) Date of Patent: Jun. 28, 2011

(54) ONBOARD FUEL CELL SYSTEM AND METHOD OF DISCHARGING HYDROGEN-OFF GAS

(75) Inventors: Kiyoshi Yoshizumi, Toyota (JP); Kazunori Yanagihara, Toyota (JP); Tsukuo Ishitoya, Susono (JP); Shinpei Miura, Susono (JP); Yasuhiro Nonobe, Susono (JP); Minobu Mizuno, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 751 days.

(21) Appl. No.: 10/050,866

(22) Filed: Jan. 18, 2002

(65) Prior Publication Data
US 2002/0094469 A1    Jul. 18, 2002

(30) Foreign Application Priority Data

Jan. 18, 2001  (JP) .................................. 2001-010538
Jun. 15, 2001  (JP) .................................. 2001-181092

(51) Int. Cl.
*H01M 8/04*   (2006.01)
(52) U.S. Cl. ........ 429/444; 429/408; 429/415; 429/512; 429/513; 429/515
(58) Field of Classification Search .................... 429/22, 429/26, 12, 17, 19, 20, 15, 34, 13, 16, 14, 429/30, 31, 40; 423/652; 181/237; 205/785.5, 205/764; 431/268; 422/198; 48/197 R, 48/127.9
See application file for complete search history.

(56) References Cited

U.S. PATENT DOCUMENTS

| | | | |
|---|---|---|---|
| 2,850,038 A * | 9/1958 | Shabaker | 137/505.13 |
| 5,059,494 A * | 10/1991 | Vartanian et al. | 429/17 |
| 5,917,161 A * | 6/1999 | Fuhrmann | 181/237 |
| 6,013,385 A | 1/2000 | DuBose | |
| 6,124,054 A | 9/2000 | Gorman et al. | |
| 6,378,637 B1 | 4/2002 | Ono et al. | |
| 6,395,414 B1 | 5/2002 | Clingerman et al. | |
| 6,455,181 B1 * | 9/2002 | Hallum | 429/13 |

(Continued)

FOREIGN PATENT DOCUMENTS

CA    2274240 A1    3/2000

(Continued)

OTHER PUBLICATIONS

Schmidt, Translation of an Office Action, No Date, TFN010215-DE, 10201668.2-45, whole document.*

(Continued)

*Primary Examiner* — Robert Hodge
(74) *Attorney, Agent, or Firm* — Oblon, Spivak, McClelland, Maier & Neustadt, L.L.P.

(57) ABSTRACT

Consumed hydrogen-off gas is discharged from a fuel cell via a hydrogen-off gas exhaust flow passage. Consumed oxygen-off gas is discharged from the fuel cell via an oxygen-off gas exhaust flow passage. The oxygen-off gas flowing through the oxygen-off gas exhaust flow passage and the hydrogen-off gas flowing through the hydrogen-off gas exhaust flow passage are mixed and diluted in a mixing portion. The gases mixed in the mixing portion flow into a combustor via a gas-liquid separator. The combustor, which includes a platinum catalyst, causes hydrogen contained in the mixed gases to react with oxygen by combustion and further reduces the concentration of hydrogen contained in the mixed gases. The mixed gases whose concentration of hydrogen has been reduced by the combustor is discharged to the atmosphere.

41 Claims, 12 Drawing Sheets

U.S. PATENT DOCUMENTS

| | | | |
|---|---|---|---|
| 6,521,204 B1 * | 2/2003 | Borup et al. | 423/652 |
| 6,630,260 B2 * | 10/2003 | Forte et al. | 429/19 |
| 6,696,188 B1 * | 2/2004 | Boneberg et al. | 429/17 |
| 6,815,106 B1 * | 11/2004 | Salvador et al. | 429/22 |
| 2002/0094468 A1 | 7/2002 | Miura et al. | |
| 2003/0037983 A1 | 2/2003 | Hanaya et al. | |
| 2003/0077488 A1 | 4/2003 | Yamamoto et al. | |
| 2003/0091879 A1 * | 5/2003 | Rusta-Sellehy et al. | 429/20 |
| 2008/0063906 A1 | 3/2008 | Nonobe et al. | |

FOREIGN PATENT DOCUMENTS

| | | | |
|---|---|---|---|
| DE | 35 37 527 A1 | | 6/1992 |
| DE | 4219113 | * | 12/1993 |
| DE | 693 02 902 | | 12/1996 |
| DE | 196 20 501 | | 8/1997 |
| DE | 42 19 113 | | 1/1998 |
| DE | 199 03 168 | | 8/2000 |
| DE | 100 65 459 B4 | | 8/2001 |
| GB | 2 242 563 A | | 10/1991 |
| JP | 4-13411 | | 1/1992 |
| JP | 5-125936 | | 5/1993 |
| JP | 8-138697 | | 5/1996 |
| JP | 10-189010 | | 7/1998 |
| JP | 11-185783 | | 7/1999 |
| JP | 11-233129 | | 8/1999 |
| JP | 2001-21111 | | 1/2001 |
| JP | 2001-113960 | | 4/2001 |
| JP | 2004-136828 | | 5/2004 |
| JP | 2004-341795 | | 12/2004 |
| JP | 2006-313664 | | 11/2006 |
| WO | WO 00/45456 | * | 8/2000 |
| WO | WO 00/63993 | * | 10/2000 |
| WO | WO 01/97310 A2 | | 12/2001 |

OTHER PUBLICATIONS

Transalation of WO 00/63993.*

Office Action issued Sep. 9, 2010, co-pending U.S. Appl. No. 12/710,755.

* cited by examiner

US 7,968,242 B2

ONBOARD FUEL CELL SYSTEM AND METHOD OF DISCHARGING HYDROGEN-OFF GAS

INCORPORATION BY REFERENCE

The disclosures of Japanese Patent Applications No. 2001-10538 filed on Jan. 18, 2001 and No. 2001-181092 filed on Jun. 15, 2001, each including the specification, drawings and abstract, are incorporated herein by reference in their entirety.

BACKGROUND OF THE INVENTION

1. Field of the Invention

The invention relates to an onboard fuel cell system that is suited to be installed in vehicles such as automobiles and the like, and to a method of discharging hydrogen-off gas.

2. Description of Related Art

Fuel cells, which generate electric power by being supplied with hydrogen gas from high-pressure hydrogen gas tanks, hydrogen-occluding alloy tanks, or the like, exhibit high energy efficiency and thus are promising as a power source for electric vehicles and the like.

In the case where such a fuel cell is used as a power source for a vehicle, the vehicle requires being equipped with a fuel cell system including not only a fuel cell but also a hydrogen gas-supplying source such as the high-pressure hydrogen gas tank or the hydrogen-occluding alloy tank as mentioned above, and hydrogen gas flow passages for delivering hydrogen gas to the fuel cell from the hydrogen gas-supplying source.

Because a fuel cell system to be installed in a vehicle uses highly combustible hydrogen gas, it is necessary to pay careful attention in handling hydrogen gas. However, not much attention has been paid to hydrogen-off gas that has already been consumed to generate electric power in the fuel cell. That is, although this hydrogen-off gas contains unconsumed hydrogen, it is in fact discharged to the atmosphere directly.

In view of such circumstances, the inventors have recognized a new problem described below and decided to tackle it.

Gases containing hydrogen are combustible. Therefore, if the concentration of hydrogen in gases discharged to the atmosphere is increased while something that could act as an ignition source is located close to an exhaust port through which the gases are discharged, there is a danger that hydrogen-off gas will catch fire.

SUMMARY OF THE INVENTION

It is thus an object of one aspect of the invention to provide an onboard fuel cell system and a method of discharging hydrogen-off gas which are capable of solving the aforementioned problem and discharging hydrogen-off gas to the atmosphere while reducing the concentration of hydrogen to a sufficiently low level.

In order to achieve at least part of the aforementioned object, an onboard fuel cell system according to one aspect of the invention comprises a fuel cell, a first flow passage, a second flow passage, a mixing portion, and a third flow passage. The fuel cell is supplied with hydrogen gas and oxidative gas, generates electric power using the hydrogen gas and the oxidative gas, and discharges hydrogen-off gas and oxygen-off gas that have been consumed. The first flow passage leads to a hydrogen-off gas exhaust port of the fuel cell. The discharged hydrogen-off gas flows through the first flow passage. The second flow passage leads to an oxygen-off gas exhaust port of the fuel cell. The discharged oxygen-off gas flows through the second flow passage. The mixing portion introduces the discharged hydrogen-off gas and the discharged oxygen-off gas from the first and second flow passages respectively and mixes the oxygen-off gas with the hydrogen-off gas. The third flow passage leads to the mixing portion. The mixed gases flow through the third flow passage so that the hydrogen-off gas is discharged to the atmosphere.

A method of discharging hydrogen-off gas to the atmosphere according to another aspect of the invention is applied to a fuel cell which is supplied with hydrogen gas and oxidative gas, which generates electric power using the hydrogen gas and the oxidative gas, and which discharges hydrogen-off gas and oxygen-off gas that have been consumed. In particular, this method comprises the steps of mixing the hydrogen-off gas discharged from the fuel cell with the discharged oxygen-off gas, and discharging the mixed gases to the atmosphere.

Thus, the onboard fuel cell system according to one aspect of the invention or the method of discharging hydrogen gas according to another aspect of the invention is designed such that hydrogen-off gas that has been discharged from the fuel cell is mixed with oxygen-off gas that has also been discharged from the fuel cell. Because oxygen-off gas is nitrogen-rich gas, the aforementioned mixture of the gases makes it possible to dilute hydrogen-off gas and reduce the concentration of hydrogen contained in the mixed gases. Accordingly, it becomes possible to discharge the mixed gases to the atmosphere after the concentration of hydrogen has been reduced.

In order to achieve at least part of the aforementioned object, an onboard fuel cell system according to a second aspect of the invention comprises a diffusion member. The diffusion member is disposed at an end of a flow passage for discharging hydrogen-off gas discharged from the fuel cell or gases containing the hydrogen-off gas to the atmosphere. The diffusion member diffuses gases flowing out from an opening at the end of the flow passage in the radial direction of the opening.

This construction ensures that gases will be discharged into the atmosphere from the opening at the end of the flow passage while being diffused in the radial direction of the opening. The exhaust gas (hydrogen-off gas) that has thus been discharged and diffused all over more often comes into contact with air surrounding the end of the flow passage, and is diluted correspondingly. Thus, the concentration of hydrogen can be reduced smoothly at the end of the flow passage.

DETAILED DESCRIPTION OF PREFERRED EMBODIMENTS

Hereinafter, embodiments of the invention will be described.

Figure 1:
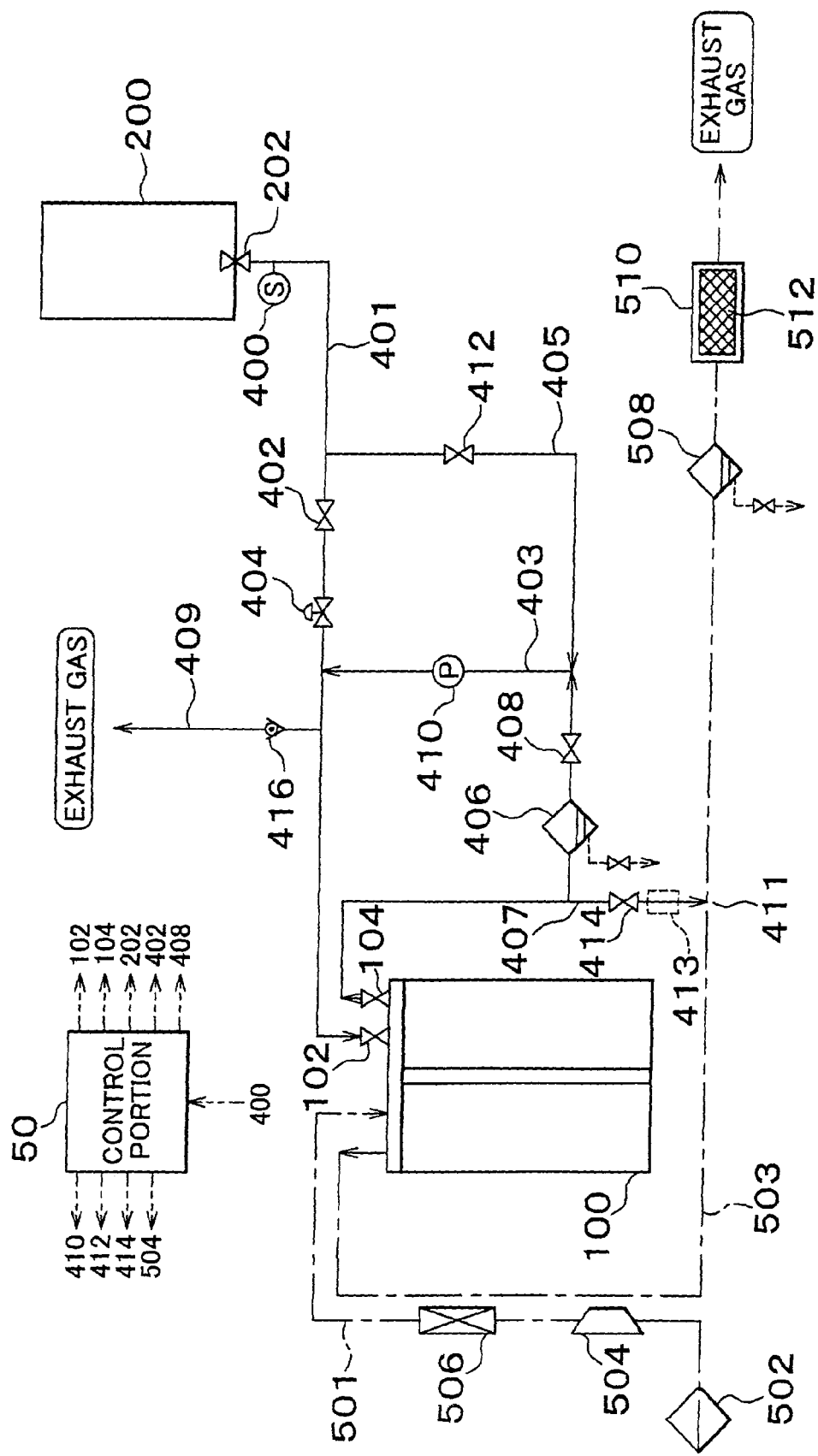
FIG. 1 is a block diagram of an onboard fuel cell system according to a first embodiment of the invention.

FIG. 1 is a block diagram of an onboard fuel cell system according to a first embodiment of the invention. The fuel cell system of this embodiment is designed to be installed in a vehicle such as an automobile or the like, and is mainly composed of a fuel cell 100 and a hydrogen-occluding alloy tank 200. The fuel cell 100 is supplied with hydrogen gas and generates electric power. The hydrogen-occluding alloy tank 200 supplies the fuel cell 100 with hydrogen gas.

The fuel cell 100 is supplied with oxidative gas containing oxygen (e.g., air) as well as hydrogen gas containing hydrogen, causes electrochemical reactions in its anode (hydrogen pole) and cathode (oxygen pole) according to reaction formulae shown below, and generates electric power.

That is, if the anode and the cathode are supplied with hydrogen gas and oxidative gas respectively, the reactions according to the formulae (1) and (2) occur on the anode side and the cathode side respectively. As a whole, the reaction according to the formula (3) occurs in the fuel cell.

$$H_2 \rightarrow 2H^+ + 2e^- \quad (1)$$

$$2H^+ + 2e^- + (\tfrac{1}{2})O_2 \rightarrow H_2O \quad (2)$$

$$H_2 + (\tfrac{1}{2})O_2 \rightarrow H_2O \quad (3)$$

If the fuel cell 100 thus constructed is employed as a power source for a vehicle, an electric motor (not shown) is driven by electric power generated by the fuel cell 100. A torque generated by the electric motor is transmitted to axles (not shown) so that a force for propelling the vehicle is obtained.

The fuel cell 100 has a stacked structure. That is, a plurality of single cells are stacked and thus constitute the fuel cell 100. Each of the single cells is composed of an electrolytic film (not shown), diffusion electrodes (not shown), and two separators (not shown). The diffusion electrodes are composed of an anode and a cathode between which the electrolytic film is interposed on its opposed sides. The anode and the cathode are interposed between the two separators. Each of the separators assumes an convexo-concave shape on both surfaces thereof. While the anode and the cathode are interposed between the separators, a single-cell gas flow passage is formed between the anode and a corresponding one of the separators and between the cathode and the other separator, respectively. The hydrogen gas that has been supplied as described above flows through the single-cell gas flow passage formed between the anode and the corresponding one of the separators. Oxidative gas flows through the single-cell gas flow passage formed between the cathode and the other separator.

The hydrogen-occluding alloy tank 200 includes a hydrogen-occluding alloy (not shown). In general, the hydrogen-occluding alloy has the properties of causing an endothermic reaction and discharging hydrogen when heated and causing an exothermic reaction and absorbing hydrogen when cooled. Accordingly, if hydrogen is extracted from the hydrogen-occluding alloy, the hydrogen-occluding alloy in the hydrogen-occluding alloy tank 200 is heated by means of a heat exchange system (not shown).

Because the hydrogen-occluding alloy deteriorates in the presence of impurities, highly pure hydrogen is accumulated in the hydrogen-occluding alloy tank 200.

In addition, as shown in FIG. 1, the fuel cell system of this embodiment has a hydrogen gas flow passage through which hydrogen gas flows in the system, an oxidative gas flow passage through which oxidative gas flows in the system, and a control portion 50.

The hydrogen gas flow passage is composed of a main flow passage 401, a circulation flow passage 403, a bypass flow passage 405, an exhaust flow passage 407, and a relief flow passage 409. The main flow passage 401 extends from a discharge port of the hydrogen-occluding alloy tank 200 to a supply port 102 of the fuel cell 100. The circulation flow passage 403 extends from an exhaust port of the fuel cell 100 via a later-described pump 410 back to the main flow passage 401. The bypass flow passage 405 branches off from the main flow passage 401 and leads to the circulation flow passage 403. The exhaust flow passage 407 is designed to discharge impurities contained in circulating hydrogen gas. The relief flow passage 409 is designed to discharge hydrogen gas if an abnormal pressure is applied thereto.

A shut valve 202 is disposed in the main flow passage 401 at the discharge port of the hydrogen-occluding alloy tank 200. The main flow passage 401 extends across a pressure sensor 400, a shut valve 402, and a pressure-reducing valve 404. A shut valve 102 is disposed at the supply port 102 of the fuel cell 100. A shut valve 104 is disposed in the circulation flow passage 403 at the exhaust port of the fuel cell 100. The circulation flow passage 403 extends across a gas-liquid separator 406, a shut valve 408, and the pump 410. Furthermore, shut valves 412, 414, and 416 are disposed in the bypass flow passage 405, the exhaust flow passage 407, and the relief flow passage 409, respectively.

The oxidative gas flow passage has an oxidative gas supply flow passage 501 for supplying the fuel cell 100 with oxidative gas and an oxygen-off gas exhaust flow passage 503 for discharging oxygen-off gas discharged from the fuel cell 100.

An air cleaner 502, a compressor 504, and a humidifier 506 are disposed in the oxidative gas supply flow passage 501. Also, a gas-liquid separator 508 and a combustor 510 are disposed in the oxygen-off gas exhaust flow passage 503.

The exhaust flow passage 407 in the aforementioned hydrogen gas flow passage is connected to the oxygen-off gas exhaust flow passage 503 in the aforementioned oxidative gas flow passage, and the region around a point of connection between them constitutes a mixing portion 411.

A detection result obtained from the pressure sensor 400 is inputted to the control portion 50. The control portion 50 controls the valves 102, 104, 202, 402, 408, 412, and 414, the pump 410, and the compressor 504 respectively. It is to be noted herein that control lines and the like are omitted for the sake of simplicity of the drawing.

First of all, it will be described briefly how oxidative gas flows. The control portion 50 drives the compressor 504, whereby air in the atmosphere is introduced as oxidative gas. The oxidative gas is purified by the air cleaner 502, flows through the oxidative gas supply flow passage 501, and is supplied to the fuel cell 100 via the humidifier 506. The oxidative gas that has thus been supplied is consumed for the aforementioned electrochemical reactions in the fuel cell 100 and is then discharged as oxygen-off gas. The oxygen-off gas that has thus been discharged flows through the oxygen-off gas exhaust flow passage 503 and is discharged to the atmosphere outside the vehicle via the gas-liquid separator 508 and the combustor 510.

It will now be described how hydrogen gas flows. The control portion 50 basically holds the shut valve 202 in the hydrogen-occluding alloy tank 200 and the shut valves 102, 104 in the fuel cell 100 open if the fuel cell system is in operation, but holds them closed if the fuel cell system is out of operation.

In addition, during normal operation, the control portion 50 holds the shut valve 402 in the main flow passage 401 and the shut valve 408 in the circulation flow passage 403 open, but holds the shut valve 412 in the bypass flow passage 405 and the shut valve 414 in the exhaust flow passage 407 closed. The relief valve 416 is closed, for example, unless an abnormal pressure is applied thereto. The pressure sensor 400 detects pressure of hydrogen gas discharged from the hydrogen-occluding alloy tank 200.

During normal operation, as described above, the hydrogen-occluding alloy in the hydrogen-occluding alloy tank 200 is heated by the heat exchange system so that hydrogen gas is discharged. The hydrogen gas that has been discharged flows through the main flow passage 401, is depressurized by the pressure-reducing valve 404, and is then supplied to the fuel cell 100. The hydrogen gas that has thus been supplied is consumed for the aforementioned electrochemical reactions in the fuel cell 100 and is then discharged as hydrogen-off gas. The hydrogen-off gas that has been discharged flows through the circulation flow passage 403, is removed of liquid water contents in the hydrogen-off gas by the gas-liquid separator 406, is returned to the main flow passage 401 via the pump 410, and is then supplied to the fuel cell 100 again. At this moment, the pump 410 disposed in the circulation flow passage 403 is driven, whereby hydrogen-off gas flowing through the circulation flow passage 403 gushes out to the main flow passage 401. Thus, during normal operation, hydrogen gas circulates through the main flow passage 401 and the circulation flow passage 403.

Thus, hydrogen-off gas that has been discharged from the fuel cell is returned to the supply port 102 of the fuel cell 100, and hydrogen gas circulates. Therefore, even if the amount of hydrogen consumed by the fuel cell 100 remains unchanged, the apparent amount of hydrogen gas supplied to the fuel cell 100 and the flow rate of hydrogen gas are increased. Hence, there is created a condition that is favorable from the standpoint of supplying the fuel cell 100 with hydrogen. As a result, the output voltage of the fuel cell 100 is also increased. Also, since impurities contained in hydrogen gas are homogenized in the entire hydrogen gas flow passage, there is no chance that the impurities will hamper the fuel cell from generating electric power.

Impurities contained in oxidative gas, such as nitrogen and the like, flow from the cathode side, penetrate the electrolytic film, and leak out to the anode side. Nevertheless, since hydrogen-off gas circulates as described above, it is possible to avoid a situation in which the impurities accumulate in the anode. Thus, there is no chance that the fuel cell 100 will be hampered from generating electric power due to the piling-up of impurities such as nitrogen or the like and that the output voltage of the fuel cell 100 will be lowered.

The control portion 50 controls the driving of the pump 410. The flow rate of hydrogen-off gas flowing through the circulation flow passage 403 is changed in accordance with the amount of consumption of electric power generated by the fuel cell 100.

Hydrogen gas flows substantially as described above during normal operation. It will now be described how hydrogen gas flows at the time of cold start.

In general, the pressure of hydrogen discharged from the hydrogen-occluding alloy is increased in proportion to a rise in temperature and is reduced in proportion to a fall in temperature. Thus, hydrogen becomes less likely to be discharged as the temperature of the hydrogen-occluding alloy tank falls. Therefore, the fuel cell system is designed to extract hydrogen gas from the hydrogen-occluding alloy tank 200 by means of the pump 410 at the time of cold start.

In starting the fuel cell system, if the ambient temperature is low and if the pressure of hydrogen gas detected by the pressure sensor 400 is lower than a reference pressure, the control portion 50 closes the shut valve 402 in the main flow passage 401, the shut valve 408 in the circulation flow passage 403, and the shut valve 414 in the exhaust flow passage 407 respectively, opens the shut valve 412 in the bypass flow passage 405, and drives the pump 410 at a high speed. Thereby, even in the case where the hydrogen-occluding alloy tank 200 is at a low temperature and where discharged hydrogen gas is at a low pressure, a sufficient amount of occluded hydrogen gas is extracted from the hydrogen-occluding alloy tank 200. The hydrogen gas that has thus been extracted enters the bypass flow passage 405 from the main flow passage 401, flows through the circulation flow passage 403, returns to the main flow passage 401, and is supplied to the fuel cell 100. The hydrogen gas that has thus been supplied is consumed for the electrochemical reactions in the fuel cell 100, turns into hydrogen-off gas, and is discharged to the circulation flow passage 403. The concentration of impurities contained in hydrogen-off gas increases as time passes. Accordingly, with a view to removing the impurities, the shut valve 414 is occasionally opened so as to discharge hydrogen-off gas from the exhaust flow passage 407.

Hydrogen gas flows as described hitherto at the time of cold start. The discharge of hydrogen-off gas, which characterizes the invention, will now be described in detail.

As described above, if the fuel cell system is in normal operation, hydrogen gas is caused to circulate by returning hydrogen-off gas discharged from the fuel cell 100 to the main flow passage 401 via the circulation flow passage 403 with a view to homogenizing the impurities contained in hydrogen gas. However, even if hydrogen gas has thus been homogenized, impurities constantly leak out from the cathode side to the anode side in the fuel cell 100. Therefore, after the lapse of a long time, the concentration of impurities in the homogenized hydrogen gas is increased gradually. As the concentration of the impurities is increased, the concentration of hydrogen is reduced.

Hence, the shut valve 414 is disposed in the exhaust flow passage 407 that branches off from the circulation flow passage 403. If the concentration of impurities in circulating hydrogen gas is increased, the control portion 50 opens the shut valve 414 so as to discharge part of the circulating hydrogen gas that contains impurities. Thereby, part of the hydrogen gas containing the impurities is discharged from the circulation passage, and pure hydrogen gas is introduced correspondingly from the hydrogen-occluding alloy tank 200. Thus, the concentration of the impurities in hydrogen gas is reduced. Conversely, the concentration of hydrogen is increased. As a result, the fuel cell 100 can generate electric power continuously and suitably. Although the interval at which the shut valve 414 is opened differs depending on the operational condition or the output, the shut valve 414 may be opened, for example, at intervals of about 5 seconds.

As described above, water ($H_2O$) is produced on the cathode side in the fuel cell 100 according to the formula (2). The water leaks out as water vapor from the cathode via the electrolytic film to the anode side. In this embodiment, if hydrogen gas is discharged by opening the shut valve 414, torrential flow of the hydrogen gas can be created due to the pressure difference. Water contents in the fuel cell can be blown off by the momentum of the torrential flow. Hence, if water (water vapor) that is produced in accordance with the progression of the reaction according to the formula (2) has condensed and adhered to the anode side in the single cells, the aforementioned torrential flow of hydrogen gas blows the water off. Therefore, hydrogen gas is not stopped from flowing into the fuel cell.

This embodiment is designed not to detect the concentration of impurities in circulating hydrogen gas or the like but to derive in advance a period required for the concentration of impurities to reach an unallowable concentration from data stored in the past. The control portion 50 measures an elapsed time by means of a timer and opens the shut valve 414 at regular intervals of that time. However, it is possible to dispose a hydrogen concentration sensor or the like in the hydrogen gas flow passage, detect the concentration of hydrogen in circulating hydrogen gas, and open the shut valve 414 if the concentration drops below a reference concentration.

Then, hydrogen gas that has been discharged from the shut valve 414 flows through the exhaust flow passage 407, is delivered to the oxygen-off gas exhaust flow passage 503, and is mixed with oxygen-off gas flowing through the oxygen-off gas exhaust flow passage 503 in the mixing portion 411. Because hydrogen gas discharged from the shut valve 414 is hydrogen-off gas, the concentration of hydrogen is relatively low. Also, oxygen-off gas discharged from the fuel cell 100 is also nitrogen-rich gas that has been removed of oxygen in the fuel cell 100. Accordingly, if hydrogen-off gas is thus mixed with oxygen-off gas and diluted, the concentration of hydrogen contained in the mixed gases is further reduced.

Then, the gas that has been mixed in the mixing portion 411 flows into the combustor 510 via the gas-liquid separator 508. The combustor 510 is provided with a platinum catalyst 512. The combustor 510 causes hydrogen and oxygen contained in the mixed gases to react with each other through combustion and further reduces the concentration of hydrogen contained in the mixed gases.

The mixed gases whose concentration of hydrogen has thus been reduced by the combustor 510 are discharged to the atmosphere afterwards. Because hydrogen and oxygen contained in the mixed gases thus react with each other with the aid of the catalyst, the mixed gases can be discharged to the atmosphere in a state where the concentration of hydrogen has been further reduced.

Oxygen-off gas discharged from the fuel cell 100 contains a large amount of water contents as described above, and the water contents are likely to condense and turn into drops of water if the oxygen-off gas exhaust flow passage 503 is long. Accordingly, even if such oxygen-off gas is mixed with hydrogen-off gas in the mixing portion 411, the mixed gases still contain water. Thus, if the mixed gases flow through the combustor 510, the water may condense, turn into drops, and adhere to the platinum catalyst 512. As described above, since this embodiment is designed to provide the gas-liquid separator 508 forward of the combustor 510 so as to remove liquid water contained in the mixed gases, it is possible to prevent drops of water from adhering to the platinum catalyst 512 in the combustor 510 and keep the platinum catalyst 512 activated.

Even if the shut valve 414 is opened while the fuel cell 100 operates to generate electric power, the output voltage of the fuel cell 100 drops just instantaneously. That is, since the output voltage of the fuel cell 100 does not drop substantially, no problem is caused.

As described hitherto, this embodiment is designed to dilute hydrogen-off gas discharged from the fuel cell 100 by mixing it with oxygen-off gas in the mixing portion 411, and to reduce the concentration of hydrogen contained in the mixed gases by means of the combustor 510. Thus, it is possible to discharge the mixed gases to the atmosphere after the concentration of hydrogen has been reduced to a sufficiently low level. This brings about a favorable result because hydrogen-off gas is prevented from being inadvertently discharged to the atmosphere while it still exhibits a high concentration of hydrogen. In addition, since the mixed gases are discharged to the atmosphere after the concentration of hydrogen has been reduced to a concentration that is low enough to avoid ignition effectively, it is possible to enhance the reliability in avoiding ignition.

Even if a large amount of hydrogen-off gas is discharged when the control portion 50 opens the shut valve 414 so as to discharge hydrogen-off gas to the mixing portion 411, the following measures are taken with a view to maintaining a state of dilution based on the mixture with oxygen-off gas in the mixing portion 411 and enhancing the reliability in avoiding ignition.

This embodiment is designed to select one of the following four methods corresponding to the aforementioned measures so as to enhance the reliability in avoiding ignition.

Figure 2:
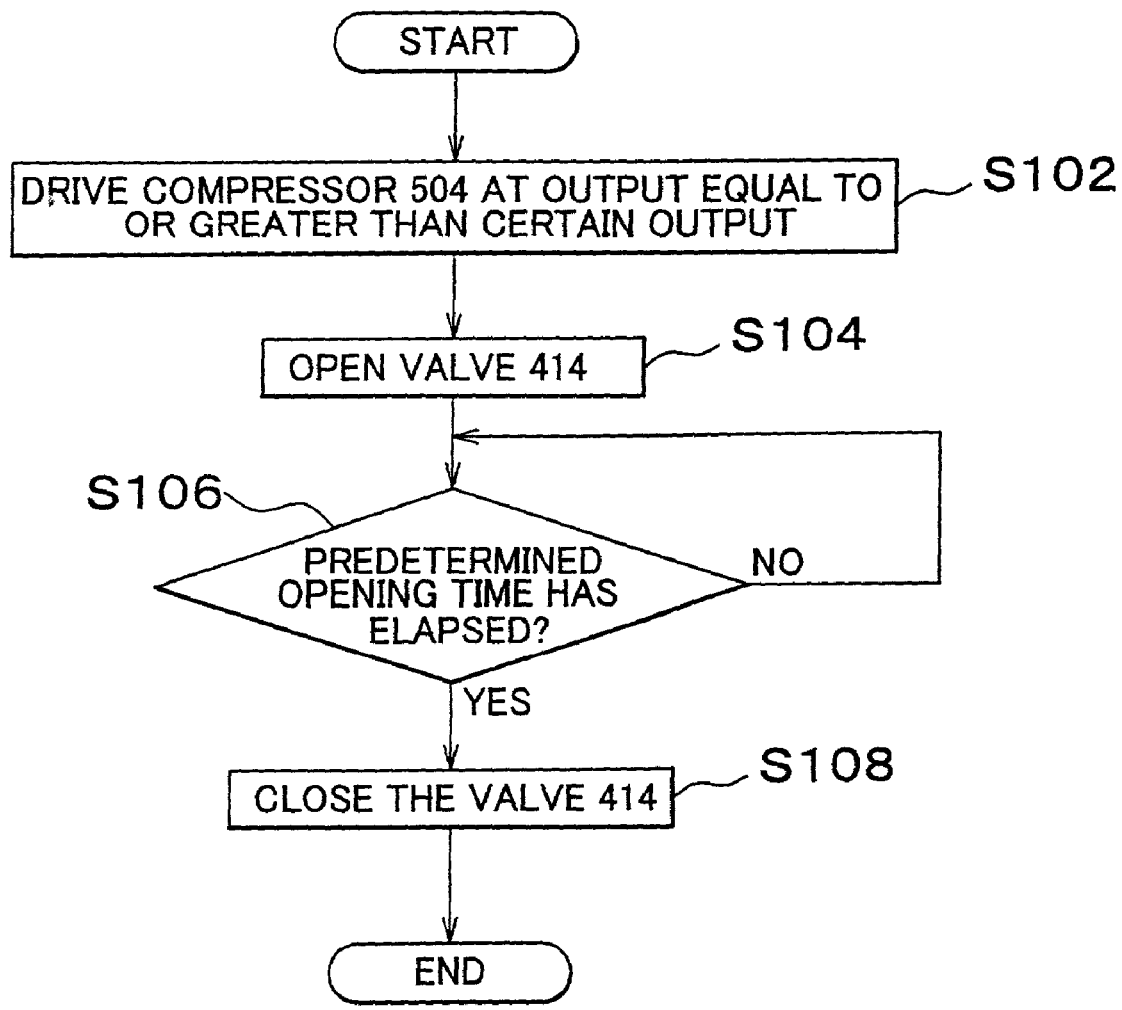
FIG. 2 is a flowchart illustrating an example of methods of discharging hydrogen-off gas in the onboard fuel cell system shown in FIG. 1.

First of all, the first method will be described with reference to FIG. 2. FIG. 2 is a flowchart illustrating one example of methods of discharging hydrogen-off gas in the onboard fuel cell system shown in FIG. 1.

If it is detected on the basis of the elapsed time, the sensor, or the like that the concentration of impurities in circulating hydrogen gas has reached an unallowable concentration, the control portion 50 starts the routine shown in FIG. 2. First of all, the control portion 50 performs control in such a manner as to drive the compressor 504 disposed in the oxidative gas-supplying flow passage 501 at an output equal to or higher than a specific output (e.g., the maximum output) (step S102). Thereby, the flow rate of oxidative gas introduced via the air cleaner 502 is increased. Thus, the flow rate of oxygen-off gas discharged from the fuel cell 100 and flowing through the oxygen-off gas exhaust flow passage 503 is also increased correspondingly. Then, the control portion 50 opens the shut valve 414 (step S104) so as to discharge circulating hydrogen gas (hydrogen-off gas) from the shut valve 414 to the mixing portion 411. If a predetermined opening time has elapsed (step S106), the shut valve 414 is closed (step S108). Thus, the routine shown in FIG. 2 is terminated. It is preferable that the opening time for the shut valve 414 be equal to or shorter than 1 second. It is more preferable that the opening time for the shut valve 414 be about 500 milliseconds.

In the case where such a method is adopted, if the shut valve 414 is opened so as to discharge hydrogen-off gas to the mixing portion 411, the flow rate of oxygen-off gas flowing through the oxygen-off gas exhaust flow passage 503 has been increased. Therefore, even if a large amount of hydrogen gas has been discharged, hydrogen-off gas is sufficiently diluted with a large amount of nitrogen-rich gas when it is mixed with oxygen-off gas in the mixing portion 411. Accordingly, the concentration of hydrogen contained in the mixed gases can be reduced. The mixed gases can be discharged to the atmosphere in a state where the concentration of hydrogen has been reduced. Therefore, it is possible to enhance the reliability in avoiding ignition.

Figure 3:
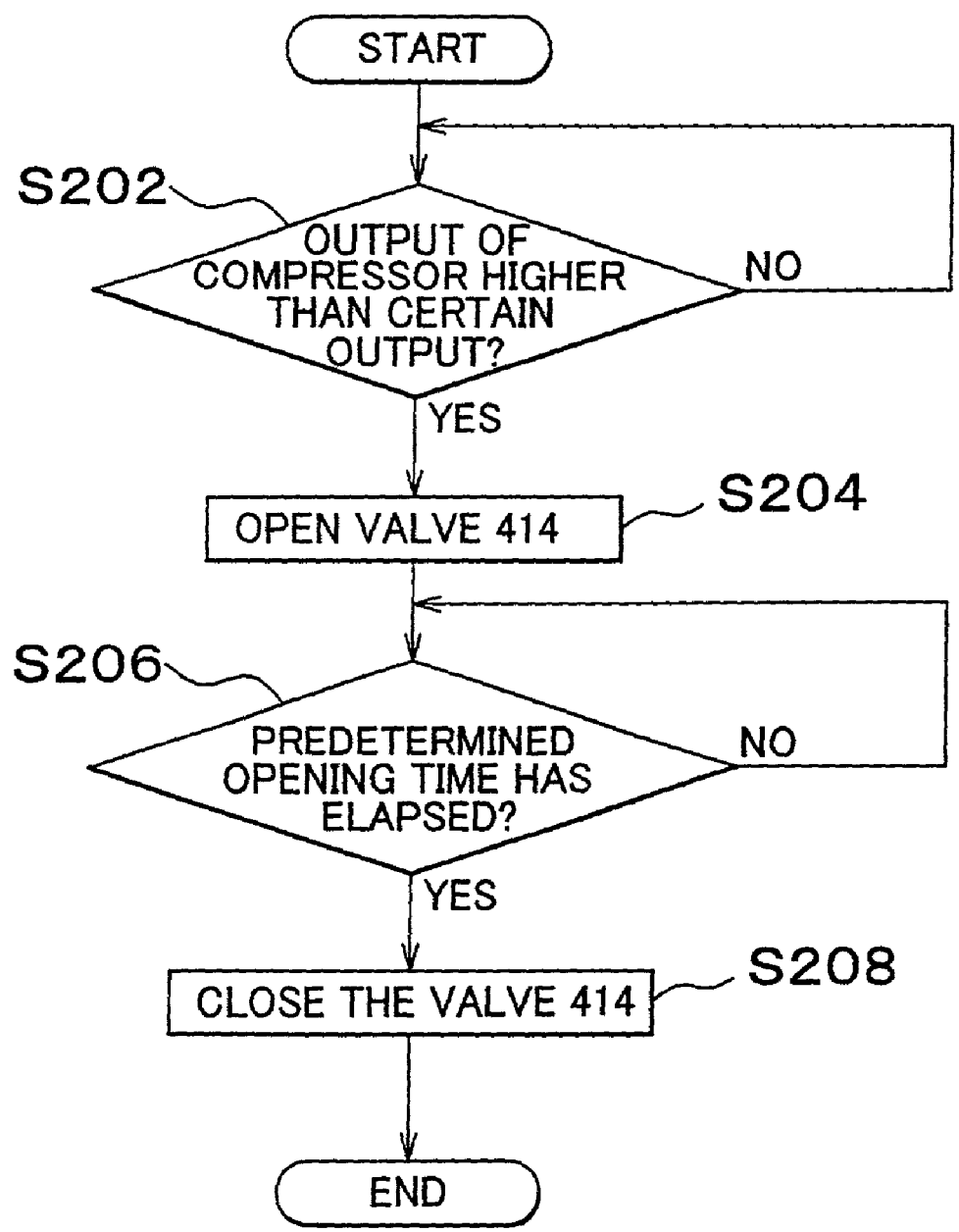
FIG. 3 is a flowchart illustrating another example of methods of discharging hydrogen-off gas in the onboard fuel cell system shown in FIG. 1.

The second method will now be described with reference to FIG. 3. FIG. 3 is a flowchart illustrating another example of methods of discharging hydrogen gas in the onboard fuel cell system shown in FIG. 1.

The method shown in FIG. 2 is designed to positively drive the compressor 504, for example, at the maximum output in opening the shut valve 414 so that hydrogen-off gas is discharged after the flow rate of oxygen-off gas has been increased. For example, however, while the vehicle is running, if the compressor 504 is driven at the maximum output regardless of the running condition of the vehicle, there is an apprehension that the driver will feel a sense of incongruity. To be more specific, if the compressor 504 is driven at the maximum output with a view to discharging hydrogen-off gas while the vehicle is creeping, the driver feels a sense of incongruity resulting from loud rotational noise, vibrations, and the like generated by the compressor 504 despite the fact that the vehicle is creeping.

Therefore, the second method is designed to open the shut valve 414 in accordance with the driving of the compressor 504 which changes depending on the running condition of the vehicle (i.e., load fluctuations).

To be more specific, as soon as the routine shown in FIG. 3 is started, the control portion 50 first waits until the output of the compressor 504 exceeds a specific output (step 202). The output of the compressor 504 can be derived from the output from a rotational speed sensor or the like attached to the compressor 504.

If the output of the compressor 504 thereafter changes in accordance with the running condition of the vehicle and exceeds a specific output, the control portion 50 opens the shut valve 414 (step S204). Thereby, hydrogen-off gas can be discharged from the shut valve 414 to the mixing portion 411 at a timing when the flow rate of oxygen-off gas flowing through the oxygen-off gas exhaust flow passage 503 is increased. If a predetermined opening time has then elapsed (step S206), the shut valve 414 is closed (step S208). Thus, the routine shown in FIG. 3 is terminated.

In the case where such a method is adopted, since hydrogen-off gas is discharged to the mixing portion 411 in response to an increase in the flow rate of oxygen-off gas as described above, hydrogen-off gas is sufficiently diluted with a large amount of nitrogen-rich gas when it is mixed with oxygen-off gas in the mixing portion 411, as in the case of the method shown in FIG. 2. Accordingly, the concentration of hydrogen contained in the mixed gases can be reduced, and the mixed gases can be discharged to the atmosphere in a state where the concentration of hydrogen has been reduced. As a result, it is possible to enhance the reliability in avoiding ignition.

Because the driving of the compressor 504 changes depending exclusively on the running condition of the vehicle, the rotational noise, vibrations, and the like of the compressor 504 match the running condition of the vehicle. Therefore, there is no apprehension that the driver will feel a sense of incongruity.

Figure 4:
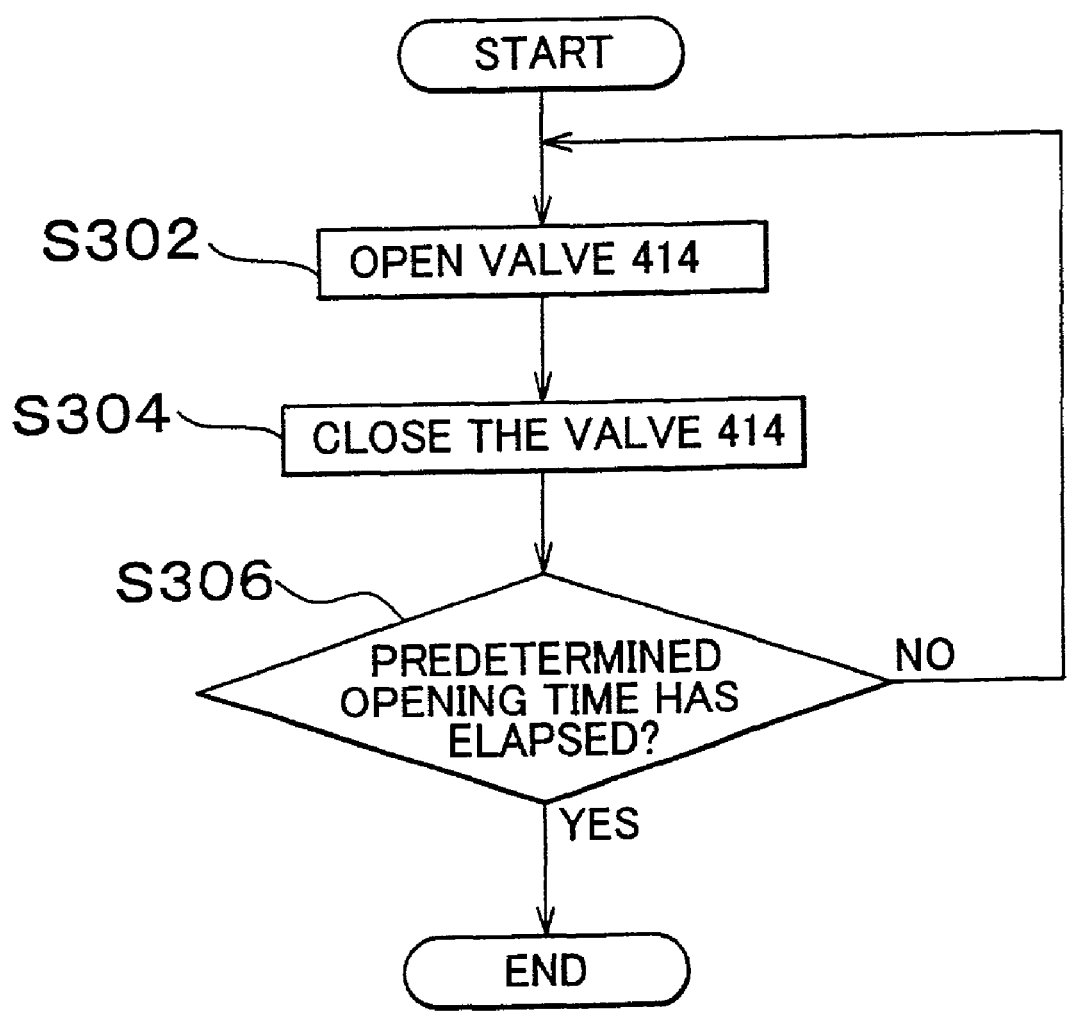
FIG. 4 is a flowchart illustrating still another example of methods of discharging hydrogen-off gas in the onboard fuel cell system shown in FIG. 1.

The third method will now be described with reference to FIG. 4. FIG. 4 is a flowchart illustrating still another example of methods of discharging hydrogen-off gas in the onboard fuel cell system shown in FIG. 1. As soon as the routine shown in FIG. 4 is started, the control portion 50 first opens the shut valve 414 (step S302) and closes it immediately (step S304). Then, the control portion 50 determines whether or not a predetermined time has elapsed since the start of the routine (step S306). If the predetermined time has not elapsed, the aforementioned operations are repeated. Thereby, the shut valve 414 is opened and closed repeatedly at intervals of a relatively short period. If a predetermined time has thereafter elapsed, the routine shown in FIG. 4 is terminated. In the case where such a method is adopted, the shut valve 414 is opened and closed repeatedly at intervals of a relatively short period. Therefore, hydrogen-off gas is discharged to the mixing portion 411 at discrete timings that are arranged at intervals of a relatively short period, and a small amount of hydrogen-off gas is discharged each time. Accordingly, even if the flow rate of oxygen-off gas has not been increased when hydrogen-off gas is mixed with oxygen-off gas in the mixing portion 411, it is possible to dilute hydrogen-off gas sufficiently. Thus, the concentration of hydrogen contained in the mixed gases is reduced. Therefore, the mixed gases can be discharged to the atmosphere in a state where hydrogen exhibits a sufficiently low concentration. As a result, it is possible to enhance the reliability in avoiding ignition.

Figure 5:
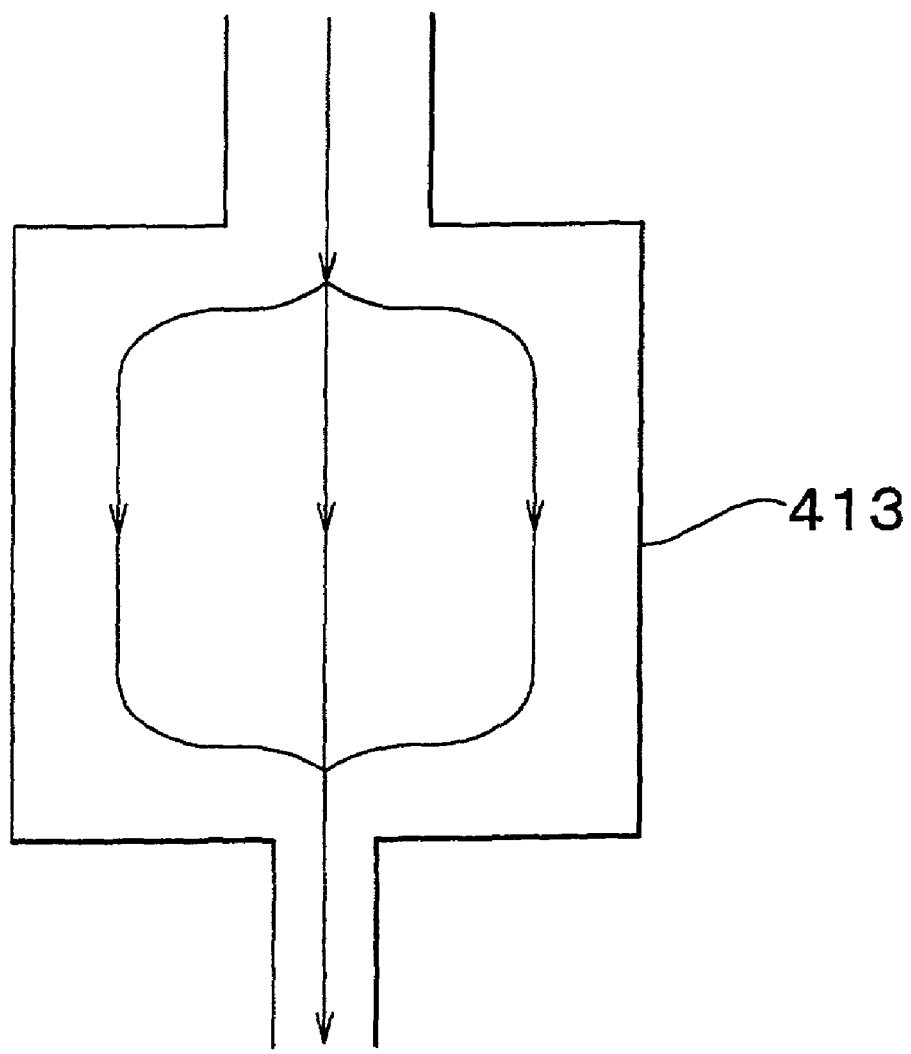
FIG. 5 is an illustrative view illustrating a buffer disposed between a shut valve 414 and a mixing portion 411 shown in FIG. 1.

The fourth method will now be described with reference to FIG. 5. In this method, the buffer 413 as shown in FIG. 5 is disposed in advance between the shut valve 414 and the mixing portion 411 in the circulation flow passage 403 shown in FIG. 1. FIG. 5 is an illustrative view illustrating the buffer disposed between the mixing portion 411 and the shut valve 414 shown in FIG. 1.

As shown in FIG. 5, the buffer 413 has outlet and inlet ports, and the outlet port is smaller in diameter than the inlet port. Also, there is a large-volume space defined in an intermediate portion between the outlet and inlet ports. Accordingly, even in the case where the control portion 50 has opened and then closed the shut valve 414 so that a large amount of hydrogen-off gas has been discharged from the shut valve 414 within a short time, if the hydrogen-off gas flows into the buffer 413, it runs into resistance and stays in the center space because the outlet port has a reduced diameter. That is, the hydrogen-off gas flows out from the outlet port to the mixing portion 411 only little by little. Accordingly, if the flow rate of hydrogen-off gas flowing into the mixing portion 411 is reduced, the hydrogen-off gas can be diluted sufficiently even in the case where the flow rate of oxygen-off gas has not been increased when hydrogen-off gas is mixed with oxygen-off gas in the mixing portion 411. Thus, the concentration of hydrogen contained in the mixed gases can be reduced sufficiently, and the mixed gases can be discharged to the atmosphere in a state where hydrogen exhibits a low concentration. As a result, it is possible to enhance the reliability in avoiding ignition.

Figure 6:
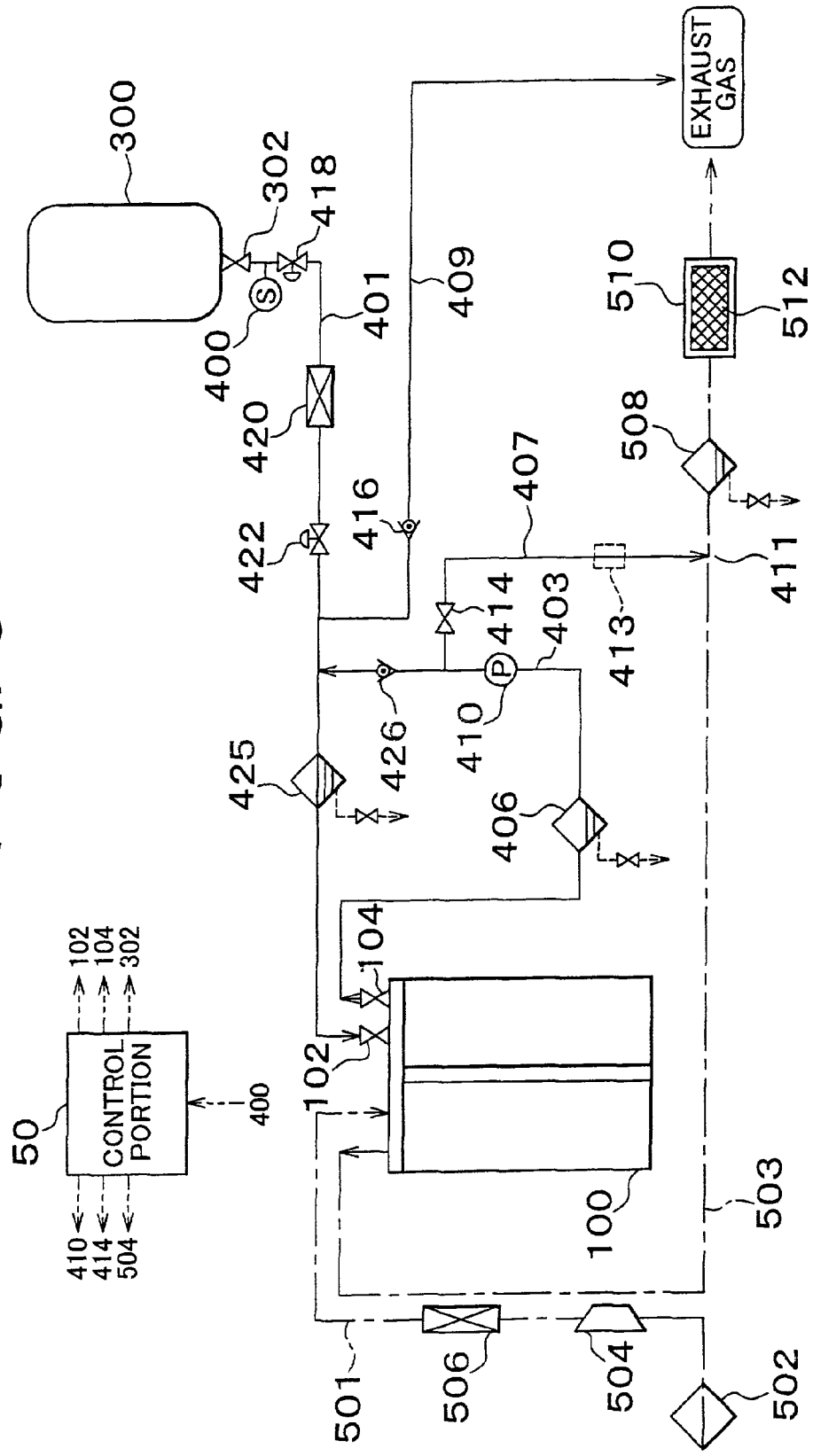
FIG. 6 is a block diagram of an onboard fuel cell system according to a second embodiment of the invention.

FIG. 6 is a block diagram of an onboard fuel cell system according to a second embodiment of the invention. Although the fuel cell system of the first embodiment employs the hydrogen-occluding alloy tank 200 as a hydrogen gas-supplying source, the fuel cell system of this embodiment employs a high-pressure hydrogen gas tank 300 instead of the hydrogen-occluding alloy tank 200.

The high-pressure hydrogen gas tank 300 is filled with high-pressure hydrogen gas. If a shut valve 302 attached to the root of the high-pressure hydrogen gas tank 300 is opened, hydrogen gas having a pressure of about 20 to 35 MPa is discharged.

Because the fuel cell 100 is identical in structure with that of the first embodiment, it will not be described again below.

Besides, although the fuel cell system of this embodiment has a hydrogen gas flow passage, an oxidative gas flow passage, and the control portion 50 as shown in FIG. 6, the oxidative gas flow passage is identical in structure with that of the first embodiment and thus will not be described again below.

The hydrogen gas flow passage is composed of the main flow passage 401, the circulation flow passage 403, the exhaust flow passage 407, and the relief flow passage 409. The main flow passage 401 extends from a discharge port of the high-pressure hydrogen gas tank 300 to the supply port of the fuel cell 100. The circulation flow passage 403 extends from the exhaust port of the fuel cell 100 via the pump 410 back to the main flow passage 401. The exhaust flow passage 407 is designed to discharge impurities in circulating hydrogen gas. The relief flow passage 409 is designed to discharge hydrogen gas if an abnormal pressure is applied thereto. Because this embodiment employs the high-pressure hydrogen gas tank 300 as a hydrogen gas-supplying source, it is possible to discharge high-pressure hydrogen gas. Thus, since there is no need to extract hydrogen gas at the time of cold start as in the case of the hydrogen-occluding alloy tank 200, this embodiment dispenses with the bypass flow passage 405.

The shut valve 302 is disposed in the main flow passage 401 at a discharge port of the high-pressure hydrogen gas tank 300. The main flow passage 401 extends across a pressure-reducing valve 418, a heat exchanger 420, a pressure-reducing valve 422, and a gas-liquid separator 425. The shut valve 102 is disposed at the supply port of the fuel cell 100. The shut valve 104 is disposed in the circulation flow passage 403 at the discharge port of the fuel cell 100. The circulation flow passage 403 extends across the gas-liquid separator 406, the pump 410, and a check valve 426. The second embodiment is identical with the first embodiment in that the shut valve 414 is disposed in the exhaust flow passage 407, that the relief valve 416 is disposed in the relief flow passage 409, that the exhaust flow passage 407 is connected to the oxygen-off gas exhaust flow passage 503, and that the region around a point of connection between them constitutes the mixing portion 411.

A detection result obtained from the pressure sensor 400 is inputted to the control portion 50. The control portion 50 controls the shut valves 102, 104, 302, and 414, the pump 410, and the compressor 504 respectively. It is to be noted herein that control lines and the like are omitted for the sake of simplicity of the drawing.

It will now be described briefly how hydrogen gas flows. Oxidative gas flows in the same manner as in the case of the first embodiment, and it will not be described below how oxidative gas flows.

The control portion 50 basically holds the shut valve 302 in the high-pressure hydrogen gas tank 300 and the shut valves 102, 104 in the fuel cell 100 open if the fuel cell system is in operation, but holds them closed if the fuel cell system is out of operation.

Furthermore, during normal operation, the control portion 50 holds the shut valve 414 in the exhaust flow passage 407 closed. The relief valve 416 is closed, for example, unless an abnormal pressure is applied thereto, as in the case of the first embodiment.

As described above, if the control portion 50 opens the shut valve 302 during normal operation, hydrogen gas is discharged from the high-pressure gas tank 300. The hydrogen gas that has been discharged flows through the main flow passage 401, is depressurized by the pressure-reducing valve 418, and is warmed by the heat exchanger 420. The hydrogen gas that has been warmed is further depressurized by the pressure-reducing valve 422, is removed of liquid water contents in hydrogen gas by the gas-liquid separator 425, and is supplied to the fuel cell 100. The hydrogen gas that has thus been supplied is consumed for the aforementioned electrochemical reactions in the fuel cell 100 and is then discharged as hydrogen-off gas. The hydrogen-off gas that has been discharged flows through the circulation flow passage 403, is removed of its liquid water contents by the gas-liquid separator 406, is returned to the main flow passage 401 via the pump 410, and is supplied to the fuel cell 100 again. At this moment, as in the case of the first embodiment, the pump 410 disposed in the circulation flow passage 403 is driven, whereby hydrogen-off gas flowing through the circulation flow passage 403 gushes out to the main flow passage 401. Thus, hydrogen gas circulates through the main flow passage 401 and the circulation flow passage 403 during normal operation. The check valve 426 is disposed in the circulation flow passage 403 between its point of connection to the main flow passage 401 and the pump 410 so as to prevent circulating hydrogen-off gas from flowing backwards.

Hydrogen gas flows as described hitherto in this embodiment. The discharge of hydrogen-off gas, which characterizes the invention, will now be described in detail.

As in the case of the first embodiment, this embodiment is also designed such that the shut valve 414 is disposed in the exhaust flow passage 407 branching off from the circulation flow passage 403 so as to discharge hydrogen gas (hydrogen-off gas) containing impurities. The hydrogen-off gas that has been discharged from the shut valve 414 is mixed and diluted with oxygen-off gas flowing through the oxygen-off gas exhaust flow passage 503 in the mixing portion 411, whereby the concentration of hydrogen contained in the mixed gases is reduced. Furthermore, the mixed gases are introduced into the combustor 510 via the gas-liquid separator 508. The hydrogen contained in the mixed gases is caused to react with oxygen with the aid of the platinum catalyst 512 in the combustor 510, so that the concentration of hydrogen contained in the mixed gases is further reduced. Thus, the mixed gases whose concentration of hydrogen has been reduced by the combustor 510 is discharged to the atmosphere afterwards.

Accordingly, as in the case of the first embodiment, this embodiment is also designed such that hydrogen-off gas discharged from the fuel cell 100 is mixed and diluted with oxygen-off gas in the mixing portion 411 and that the concentration of hydrogen contained in the mixed gases is reduced by the combustor 510. Hence, the mixed gases are discharged to the atmosphere after the concentration of hydrogen has been reduced to a concentration that is low enough to avoid ignition effectively. Therefore, it is possible to enhance the reliability in avoiding ignition.

In order to achieve further enhancement of reliability, this embodiment is also designed to select one of the four methods mentioned in the description of the first embodiment so as to open the shut valve 414 and discharge hydrogen-off gas.

In the first embodiment, since hydrogen gas flowing from the hydrogen-occluding alloy tank 200 flows through the circulation flow passage 403 at the time of cold start, the exhaust flow passage 407 branches off from a location between the shut valve 408 and the shut valve 104 of the fuel cell 100 as shown in FIG. 1. In this embodiment, however, since nothing but hydrogen-off gas flows through the circulation flow passage 403, the exhaust flow passage 407 branches off from a location downstream of the pump 410. Thus, the pump 410 applies a pressure to hydrogen-off gas flowing downstream of the pump 410. Therefore, this embodiment makes it possible to forcibly discharge hydrogen-off gas by opening the shut valve 414.

Figure 7:
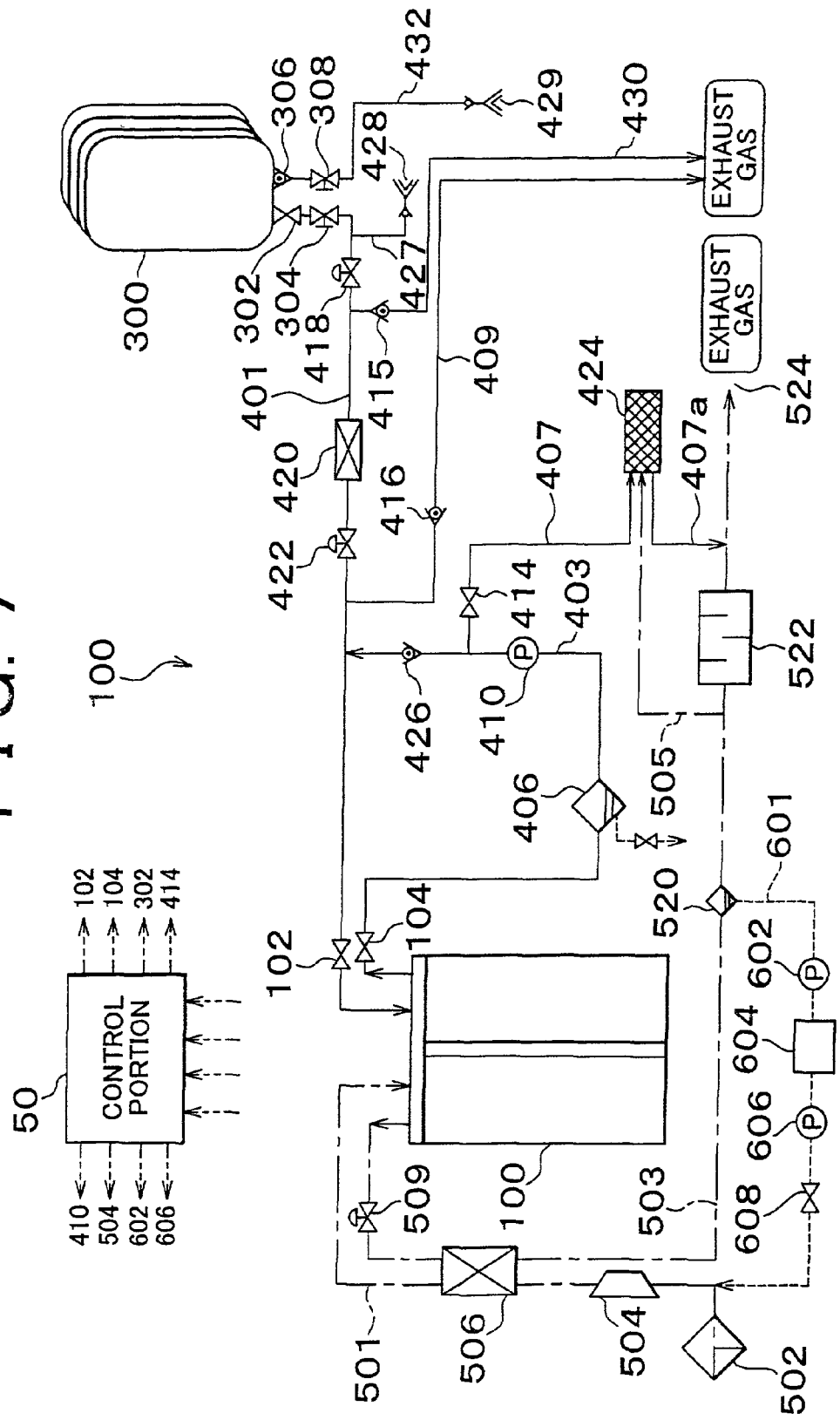
FIG. 7 is a block diagram of an onboard fuel cell system according to a third embodiment of the invention.

FIG. 7 is a block diagram of an onboard fuel cell system according to the third embodiment of the invention. The fuel cell system of the third embodiment has the same fuel cell 100 as employed in the first embodiment and employs the same high-pressure hydrogen gas tank 300 as employed in the second embodiment as a hydrogen gas-supplying source. In this embodiment, there are four high-pressure hydrogen gas tanks 300 installed in the vehicle. In this case, it is also possible to employ hydrogen-occluding alloy tanks 200 as in the case of the first embodiment. It is to be noted herein that the component members and the like that perform the same functions as in the aforementioned first and second embodiments are denoted by the same reference numerals and will not be mentioned in the following description.

In the fuel cell system of the third embodiment, as shown in FIG. 7, the hydrogen gas flow passage and the oxidative gas flow passage of the fuel cell system are partially different in construction from those of the aforementioned embodiments.

As in the case of the aforementioned embodiments, the hydrogen gas flow passage has the main flow passage 401 extending from the high-pressure hydrogen gas tank 300 to the fuel cell 100, the circulation flow passage 403 of the fuel cell 100, the exhaust flow passage 407 designed to discharge impurities, and the relief flow passage 409 designed to discharge hydrogen gas at the time of application of an abnormal pressure. In addition, the hydrogen gas flow passage of this embodiment has another relief flow passage 430, a leak check flow passage 427, and a supply flow passage 432. The relief flow passage 430 is designed to enhance the reliability in discharging hydrogen gas at the time of application of an abnormal pressure. The leak check flow passage 427 is used to check whether hydrogen gas is leaking out. The supply flow passage 432 extends from a hydrogen gas-supplying port 429 to a filling port of the high-pressure hydrogen gas tank 300.

In addition to the shut valve 302 disposed at the discharge port of the high-pressure hydrogen gas tank 300, the main flow passage 401 has a discharge manual valve 304, the pressure-reducing valve 418, a heat exchanger 420, and the pressure-reducing valve 422. As in the case of the second embodiment, the circulation flow passage 403 is provided with the gas-liquid separator 406 and the like and causes hydrogen-off gas to circulate through the check valve 426 by means of the pump 410. A check valve 306 and a filling manual valve 308 are disposed in the supply flow passage 432 at the filling port of the high-pressure hydrogen gas tank 300. The exhaust flow passage 407 has the shut valve 414 and a hydrogen diluter 424. The relief flow passages 430, 409 have a relief valve 415 and the relief valve 416 respectively. The leak check flow passage 427 has a leak check port 428.

As in the aforementioned embodiments, the oxidative gas flow passage has the oxidative gas-supplying flow passage 501 for supplying the fuel cell 100 with oxidative gas and the oxygen-off gas exhaust flow passage 503 for discharging oxygen-off gas. In addition, the oxidative gas flow passage of this embodiment has an oxygen-off gas-introducing branch flow passage 505 for introducing oxygen-off gas into the later-described hydrogen diluter 424 and a water circulation flow passage 601 for removing water from the oxygen-off gas introducing branch flow passage 505.

The component members in the oxidative gas-supplying flow passage 501 are identical in construction with those of the second embodiment. The humidifier 506 is designed to be able to humidify gas in the oxygen-off gas exhaust flow passage 503 as well. The oxygen-off gas exhaust flow passage 503 has a pressure-regulating valve 509, the aforementioned humidifier 506, a gas-liquid separator 520, and a muffler 522 serving as a silencer, which are arranged in this order from the side of the fuel cell 100. An off-gas exhaust port 524 is provided at the end of the oxygen-off gas exhaust flow passage 503.

The water circulation flow passage 601 has pumps 602, 606, a humidifying water tank 604, and an injector 608. The water circulation flow passage 601 is designed such that water that has been separated by the gas-liquid separator 520 circulates through and is supplied to the oxidative gas-supplying flow passage 501 via the pumps 602, 606.

Furthermore, detection results obtained from various sensors (not shown) are inputted to the control portion 50. The control portion 50 controls the shut valves 102, 104, 302, and 414, the pumps 410, 602, and 606, and the compressor 504 respectively. Each of the pump 410, the compressor 504, the pumps 602, 606, and the like is driven by a corresponding motor (not shown). The discharge manual valve 304 and the filling manual valve 308 are opened and closed manually.

It will now be described how gases flow. First of all, it will be described how oxidative gas flows. If the control portion 50 drives the compressor 504, air in the atmosphere is introduced as oxidative gas, as in the case of the first and second embodiments. This oxidative gas is purified by the air cleaner 502, is pressurized by the compressor 504, and is supplied to the fuel cell 100 via the humidifier 506.

The oxidative gas that has thus been supplied is consumed for the aforementioned electrochemical reactions in the fuel cell 100 and is then discharged as oxygen-off gas. The oxygen-off gas that has been discharged flows through the oxygen-off gas exhaust flow passage 503 and enters the humidifier 506 again through the pressure-regulating valve 509.

As described above, since water ($H_2O$) is produced according to the formula (2) on the cathode side in the fuel cell 100, oxygen-off gas discharged from the fuel cell 100 is very wet and contains a large amount of water contents. On the other hand, oxidative gas (air) that has been introduced from the atmosphere and pressurized by the compressor 504 exhibits low humidity. This embodiment is designed such that both the oxidative gas supply flow passage 501 and the oxygen-off gas exhaust flow passage 503 extend through the single humidifier 506 and that water vapor is exchanged therebetween so as to transfer water contents from very wet oxygen-off gas to dry oxidative gas. As a result, oxidative gas flowing out from the humidifier 506 and supplied to the fuel cell 100 is wet to some extent, and oxygen-off gas flowing out from the humidifier 506 and discharged to the atmosphere outside the vehicle is dry to some extent. Thus, the following advantages are achieved.

First of all, oxygen-off gas is prevented from being discharged directly to the atmosphere outside the vehicle through the oxygen-off gas exhaust flow passage 503 while it is still very wet with the water produced as described above. Therefore, even if the ambient temperature is very low, for example, during the cold season, there is no chance that foggy fumes of water vapor will spread out from the off-gas exhaust port 524 of the vehicle. Secondly, there is no chance that oxidative gas (air) flowing from the compressor 504 will be supplied to the fuel cell 100 while it is still dry. Thus, the cathode-side surface of the electrolytic film in the fuel cell 100 is prevented from being dried. Therefore, the efficiency of the aforementioned electrochemical reactions does not decline.

Thus, oxygen-off gas that has become dry to some extent in the humidifier 506 then flows into the gas-liquid separator 520. The gas-liquid separator 520 separates oxygen-off gas flowing from the humidifier 506 into gaseous contents and liquid contents, and removes oxygen-off gas of its liquid water contents so as to make it drier. The water contents that have been removed are recycled as recycling water, pumped up by the pump 602, and accumulated in the humidifying water tank 604. This recycling water is delivered to the injector 608 by the pump 606, sprayed by the injector 608 at an inlet port of the compressor 504, and mixed with oxidative gas flowing from the air cleaner 502. Thereby, oxidative gas flowing through the oxidative gas-supplying flow passage 501 becomes wetter.

As described above, oxygen-off gas that has become drier in the gas-liquid separator 520 is then silenced by the muffler 522 and discharged from the off-gas exhaust port 524 to the atmosphere outside the vehicle.

It will now be described how hydrogen gas flows. During normal operation, the discharge manual valve 304 in the high-pressure hydrogen gas tank 300 is always open, and the filling manual valve 308 is always closed.

The shut valve 302 in the high-pressure hydrogen gas tank 300 and the shut valves 102, 104 in the fuel cell 100 are opened and closed in the same manner as in the second embodiment.

In addition, the control portion 50 basically holds the shut valve 414 in the exhaust flow passage 407 closed during operation. The relief valves 415, 416 are closed, for example, unless an abnormal pressure is applied thereto.

During operation, as described above, if the control portion 50 opens the shut valve 302, hydrogen gas in the high-pressure hydrogen gas tank 300 is depressurized by the pressure-reducing valve 418, heated up by the heat exchanger 420, further depressurized by the pressure-reducing valve 422, removed of its liquid water contents by the gas-liquid separator 425, and supplied to the fuel cell 100, as in the case of the second embodiment. The hydrogen gas that has thus been supplied is consumed for the aforementioned electrochemical reactions in the fuel cell 100 and is then discharged as hydrogen-off gas. The hydrogen-off gas that has been discharged is accelerated by the pump 410, returned from the circulation flow passage 403 to the main flow passage 401, and supplied to the fuel cell 100 again. The check valve 426 disposed in the circulation flow passage 403 prevents circulating hydrogen-off gas from flowing backwards.

This embodiment is designed as mentioned already in the description of the first embodiment in that the output voltage of the fuel cell 100 can be increased by thus returning hydrogen-off gas to the main flow passage 401 and causing circulation of hydrogen gas.

This embodiment is also designed as mentioned already in the description of the first embodiment in that circulation of hydrogen-off gas can prevent impurities contained in oxidative gas such as oxygen and the like from piling up and that the output voltage of the fuel cell 100 can be prevented from dropping.

The control portion 50 controls the driving of the pump 410, and the pump 410 changes the flow rate of hydrogen-off gas flowing through the circulation flow passage 403 in accordance with the amount of consumption of electric power generated by the fuel cell 100.

Two pressure-reducing valves, namely, a pressure-reducing valve 418 for primary pressure reduction and a pressure-reducing valve 422 for secondary pressure reduction are disposed close to the outlet of the high-pressure hydrogen gas tank 300. These pressure-reducing valves depressurize high-pressure hydrogen gas in the high-pressure hydrogen gas tank 300 in two stages. To be more specific, the pressure-reducing valve 418 for primary pressure reduction performs pressure reduction to a pressure ranging from about 20 to 35 MPa to about 0.8 to 1 MPa, and the pressure-reducing valve 422 for secondary pressure reduction performs pressure reduction to a pressure ranging from about 0.8 to 1 MPa to about 0.2 to 0.3 MPa. As a result, the fuel cell 100 is not damaged by being supplied with high-pressure hydrogen gas. This also holds true for the second embodiment.

The pressure-reducing valve 418 for primary pressure reduction depressurizes high-pressure hydrogen gas to a pressure ranging from about 20 to 35 MPa to about 0.8 to 1 MPa. Because hydrogen is discharged from the high-pressure hydrogen gas tank 300 while being expanded, the temperature of discharged hydrogen changes depending on the pressure and flow rate thereof. This embodiment adopts a mechanism in which hydrogen gas that has been depressurized undergoes heat exchange in the heat exchanger 420 disposed between the pressure-reducing valve 418 for primary pressure reduction and the pressure-reducing valve 422 for secondary pressure reduction. Although not shown in the drawing, the heat exchanger 420 is supplied with coolant that has circulated through the fuel cell 100. Heat is exchanged between the coolant and the hydrogen gas whose temperature has changed. If hydrogen gas flows through the heat exchanger 420, its temperature comes into a substantially suitable temperature range. Thus, the hydrogen gas can be supplied to the fuel cell 100. Accordingly, it is possible to achieve a temperature sufficient to cause the reactions in the fuel cell 100. Therefore, the electrochemical reactions proceed, so that it is possible to perform a suitable operation of generating electric power. This also holds true for the second embodiment.

As described above, water ($H_2O$) is produced on the cathode side in the fuel cell 100 according to the formula (2), and the water also enters the anode side from the cathode side through the electrolytic film as water vapor. Accordingly, hydrogen-off gas discharged from the fuel cell 100 is wet and contains a considerably large amount of water contents. This embodiment is designed such that the circulation flow passage 403 extends across the gas-liquid separator 406, that the gas-liquid separator 406 separates water contents in hydrogen-off gas into gaseous and liquid contents and removes the liquid contents, and that only the gaseous contents (water vapor) are delivered to the pump 410 together with other gases. Thereby, only the gaseous contents of water in hydrogen-off gas are recirculated to the main flow passage 401. That is, there is no chance that the fuel cell 100 will be supplied with the mixture of liquid and gaseous contents of water. Thus, the hydrogen gas flow passage is not blocked by the mixture of gaseous and liquid contents. Therefore, the fuel cell 100 continues to generate electric power in a good condition, so that neither the output voltage of the single cells nor the amount of electric power generated by the entire fuel cell 100 drops. This also holds true for the second embodiment.

As described above, hydrogen gas is caused to circulate so as to homogenize impurities contained therein. However, even if hydrogen gas has thus been homogenized, impurities always leak out from the cathode side to the anode side in the fuel cell 100. Therefore, the concentration of impurities in the homogenized hydrogen gas is gradually increased after the lapse of a long time. As the concentration of impurities is increased, the concentration of hydrogen is reduced.

Thus, the shut valve 414 is disposed in the exhaust flow passage 407 branching off from the circulation flow passage 403, and the control portion 50 opens the shut valve 414 at regular intervals so as to discharge part of the circulating hydrogen gas containing impurities. If the shut valve 414 is opened, part of the hydrogen gas containing impurities is discharged from the circulation flow passage, and a corresponding amount of pure hydrogen gas is introduced from the high-pressure hydrogen gas tank 300. Thereby, the concentration of impurities in hydrogen gas is reduced. On the contrary, the concentration of hydrogen is increased. As a result, the fuel cell 100 can continue to generate electric power suitably. Although the interval at which the shut valve 414 is opened differs depending on the operational condition or the output, the shut valve 414 may be opened, for example, at intervals of about 5 seconds.

Even if the shut valve 414 is opened while the fuel cell 100 operates to generate electric power, the output voltage of the fuel cell 100 drops just instantaneously. That is, since the output voltage of the fuel cell 100 does not drop substantially, no problem is caused. It is preferable that the opening time for the shut valve 414 be equal to or shorter than 1 second. It is more preferable that the opening time for the shut valve 414 be about 500 milliseconds.

Figure 8:
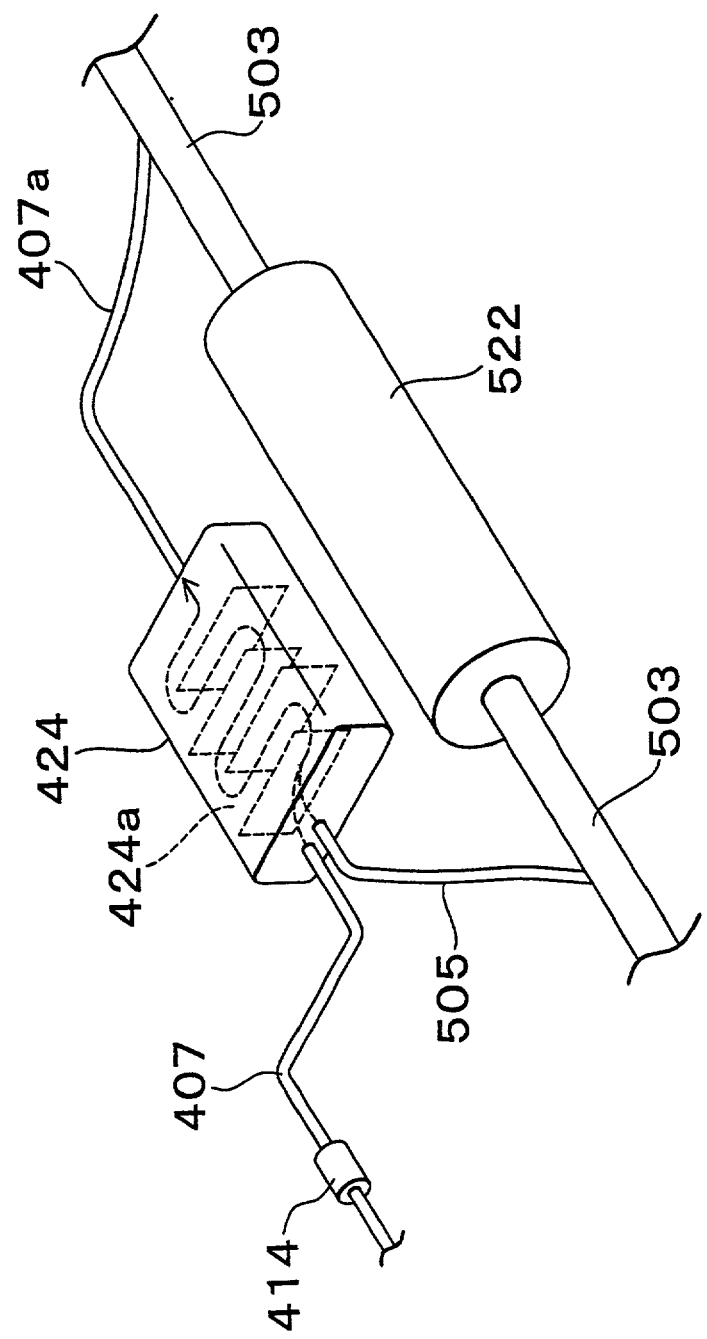
FIG. 8 is a schematic perspective view of the essential part of a hydrogen-off gas exhaust system.

It will now be described how an exhaust system for hydrogen-off gas is constructed and how hydrogen-off gas is discharged. FIG. 8 is a schematic perspective view of the essential part of the exhaust system for hydrogen-off gas. Hydrogen gas that has been discharged from the shut valve 414 flows through the exhaust flow passage 407 and is supplied to the hydrogen diluter 424. The hydrogen diluter 424 is also supplied with oxygen-off gas that has flown through the oxygen-off gas-introducing branch flow passage 505, which branches off from the oxygen-off gas exhaust flow passage 503.

The hydrogen diluter 424 is a box-shaped body in which a mixing chamber 424a for mixing gases is formed. This mixing chamber has a larger volume than the supplied-gas flow passages (the exhaust flow passage 407 and the oxygen-off gas-introducing branch flow passage 505). A shield plate 424b partitions the mixing chamber 424a such that the gas flow passage assumes a zigzag shape. The hydrogen diluter 424 having such a construction dilutes hydrogen gas discharged from the shut valve 414 by mixing the hydrogen gas and the oxygen-off gas that have been supplied as described above in the mixing chamber 424a. The hydrogen gas that has been diluted is delivered to the oxygen-off gas exhaust flow passage 503 and is mixed further with oxygen-off gas flowing through the oxygen-off gas exhaust flow passage 503. The gases that have thus been mixed flow through a downstream flow passage 407a of the exhaust flow passage 407, merge with the gas in the oxygen-off gas exhaust flow passage 503 downstream of the muffler 522, and are discharged from the off-gas exhaust port 524 to the atmosphere outside the vehicle.

This embodiment, which is designed to discharge hydrogen-off gas in this manner, has the following advantages.

First of all, hydrogen-off gas and oxygen-off gas are introduced into the mixing chamber 424a of the hydrogen diluter 424. Both gases are mixed and diluted in the mixing chamber 424a, which has a large volume. Because the volume of the mixing chamber has been increased, hydrogen-off gas and oxygen-off gas are mixed with each other efficiently. Therefore, it is possible to reliably dilute hydrogen-off gas and thus reduce the concentration of hydrogen.

Besides, the oxygen-off gas exhaust flow passage 503 is designed to introduce oxygen-off gas into the hydrogen diluter 424 through the flow passage branching off from a location upstream of the muffler 522, and to merge the mixed gases with the gas flowing downstream of the muffler 522. It is inevitable from structural reasons that the muffler 522 causes pressure loss of the fluid (oxygen-off gas) flowing therethrough. Due to this pressure loss, there is generated a difference between the pressure in the flow passage upstream of the muffler and the pressure in the flow passage downstream of the muffler. This embodiment is designed to generate such a differential pressure that the pressure at the location where the downstream flow passage 407a merges with the oxygen-off gas exhaust flow passage 503 becomes lower than the pressure at the location where the oxygen-off gas-introducing branch flow passage 505 branches off from the oxygen-off gas exhaust flow passage 503. Thus, this differential pressure makes it possible to reliably introduce oxygen-off gas into the mixing chamber 424a of the hydrogen diluter 424 through the oxygen-off gas-introducing branch flow passage 505. Therefore, oxygen-off gas can be introduced even if no special system is employed. It is also possible to simplify the construction and the control logics of the system and reduce the cost. In addition, since gases are mixed in and flow through the mixing chamber 424a having an enlarged volume, it is also possible to achieve silencing effect during passage of the gases.

The mixing portion 411 of the aforementioned first and second embodiments is the location where the downstream flow passage 407a merges with the oxygen-off gas exhaust flow passage 503. Thus, according to the third embodiment, diluted hydrogen-off gas that has been discharged from the hydrogen diluter 424 is mixed with oxygen-off gas flowing through the oxygen-off gas exhaust flow passage 503, and is further diluted, whereby the concentration of hydrogen contained in the mixed gases can further be reduced.

As a result, this embodiment also makes it possible to discharge hydrogen-off gas to the atmosphere after an attempt has been made to reduce the concentration of hydrogen to a concentration that is low enough to avoid ignition effectively. Thus, the reliability in avoiding ignition can be enhanced.

In order to achieve further enhancement of reliability, the third embodiment is also designed to select one of the four methods mentioned in the description of the first embodiment so as to open the shut valve 414 and discharge hydrogen-off gas.

On the other hand, if an abnormal situation such as malfunction of the pressure-reducing valves 418, 422 or the like arises, the pressure of hydrogen gas supplied to the fuel cell 100 may rise excessively. Thus, this embodiment is designed such that the relief flow passage 430 branching off from the main flow passage 401 at the location rearward of the pressure-reducing valve 418 extends across the relief valve 415, that the relief flow passage 409 branching off from the main flow passage 401 at the location rearward of the pressure-reducing valve 422 extends across the relief valve 416, that the relief valve 415 is opened if the pressure of hydrogen gas in the main flow passage 401 extending from the pressure-reducing valve 418 to the pressure-reducing valve 422 becomes equal to or higher than a predetermined value, and that the relief valve 416 is opened if the pressure of hydrogen gas in the main flow passage 401 extending from the pressure-reducing valve 422 to the fuel cell 100 becomes equal to or higher than a predetermined value. Thereby, hydrogen gas is discharged to the atmosphere outside the vehicle, and the pressure of hydrogen gas is prevented from rising further.

The high-pressure hydrogen gas tank 300 is filled with hydrogen gas in the following manner. That is, a hydrogen gas-supplying pipe (not shown) is connected to the hydrogen gas-supplying port 429 provided in a flank of the vehicle. By manually opening the filling manual valve 308 attached to the high-pressure hydrogen gas tank 300, high-pressure hydrogen gas supplied from the hydrogen gas-supplying pipe flows into the high-pressure hydrogen gas tank 300 via the supply flow passage 432 and fills up the high-pressure hydrogen gas tank 300. The check valve 306 is disposed at the root of the high-pressure hydrogen gas tank 300 so as to prevent hydrogen gas filling up the high-pressure hydrogen gas tank 300 from flowing backwards.

Figure 9:
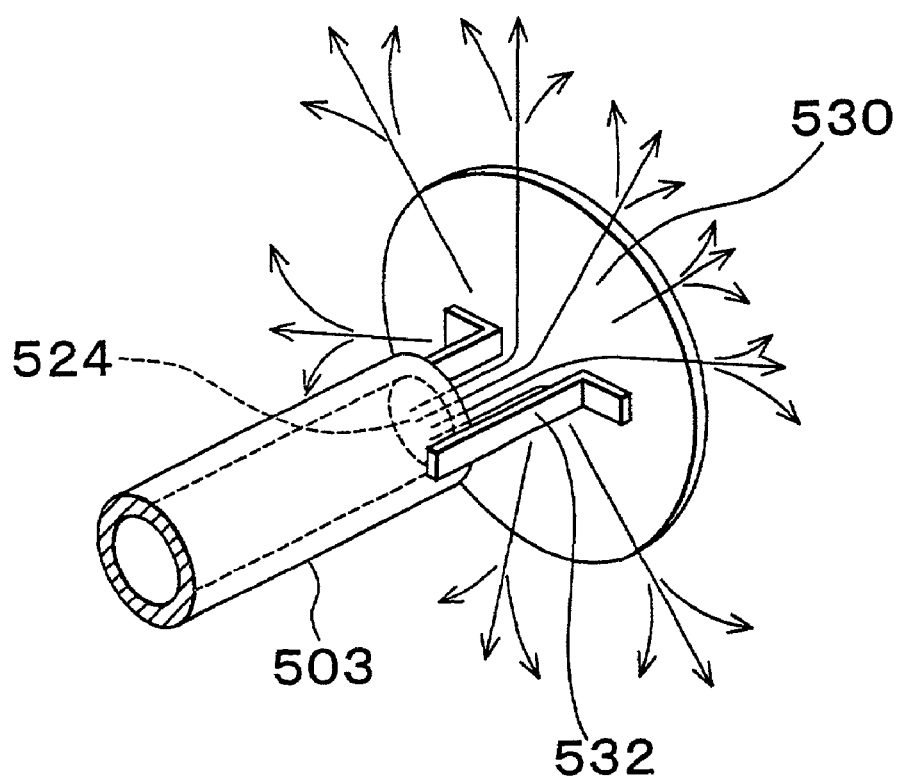
FIG. 9 is an illustrative view illustrating the region around an offgas exhaust port 524.
Figure 10:
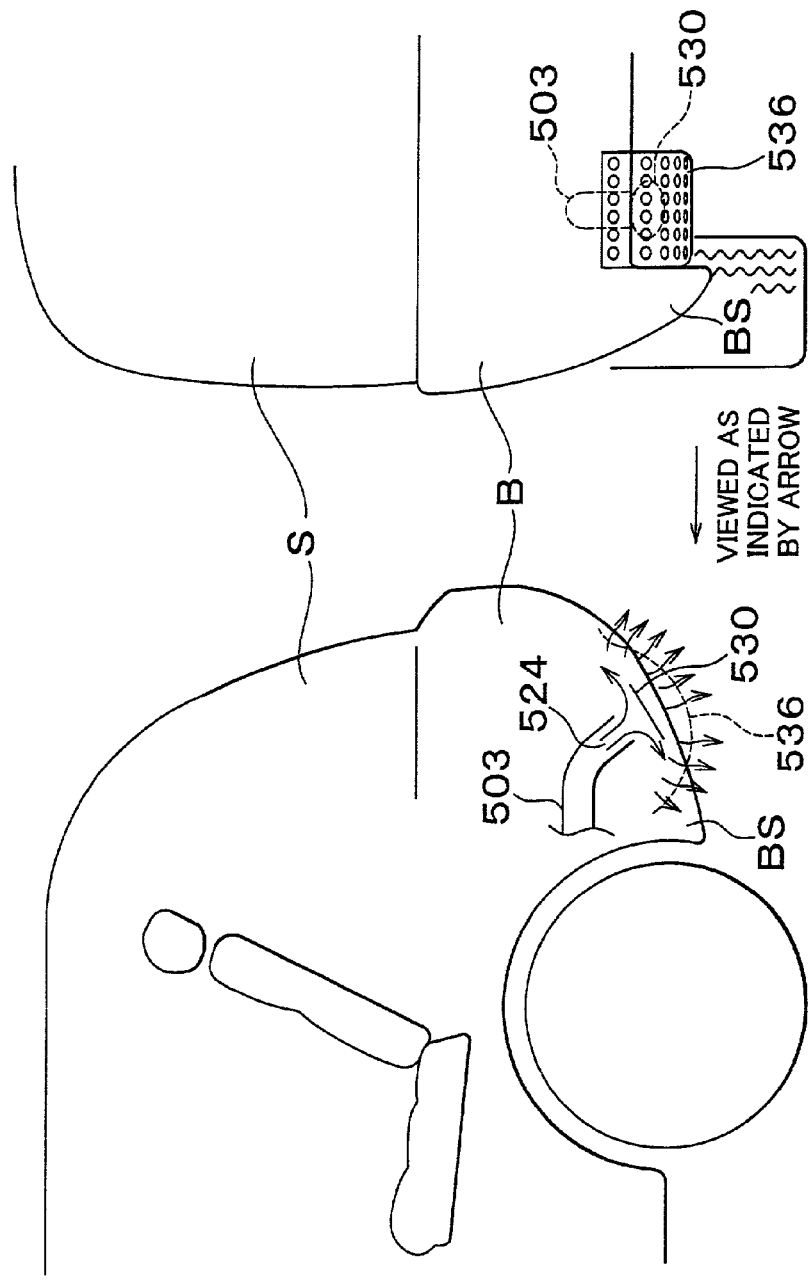
FIG. 10 is an illustrative view of the region around the offgas exhaust port 524 in relation to a vehicle body.

A gas exhaust mechanism at the offgas exhaust port 524 adopted in this embodiment will now be described. FIG. 9 is an illustrative view illustrating the region around the offgas exhaust port 524. FIG. 10 is an illustrative view of the region around the offgas exhaust port 524 in relation to the vehicle body. As shown in these drawings, the oxygen-off gas exhaust flow passage 503 has the disk-shaped diffusion plate 530 facing the offgas exhaust port 524 disposed at the end of the diffusion plate 530. The diffusion plate 530 is fixed to the oxygen-off gas exhaust flow passage 503 by a support arm 532.

As shown in FIG. 10, the oxygen-off gas exhaust flow passage 503 extends to a rear bumper B of a vehicle body S. When viewed from the flank of the vehicle body, it is apparent that a bumper skirt portion BS shields the diffusion plate 530 and the offgas exhaust port 524. A protector 536 is disposed in such a manner as to cover the offgas exhaust port 524 and the diffusion plate 530.

The protector 536 is obtained by porously punching a stainless plate material by means of a punching press or the like and forming the plate material into the shape of a dish. The protector 536 is fixed to the oxygen-off gas exhaust flow passage 503 in its region extending from the bumper skirt portion BS to the center of the vehicle body. This embodiment is designed such that the protector 536 is fixed in such a manner as to be spaced from the offgas exhaust port 524 or the diffusion plate 530 by a certain distance and that the punched holes have a diameter of about 5 mm. The punched holes are arranged such that exhaust gas flowing from the offgas exhaust port 524 can penetrate them without staying therein inadvertently. The punched holes are spaced from the offgas exhaust port 524 or the diffusion plate 530 by such a distance that the ignition source does not directly enter the offgas exhaust port 524. It is appropriate that the punched holes have such a lower-limit diameter as allows penetration of gases and punching press, namely, about 1 to 2 mm. It is appropriate that the punched holes have such an upper-limit diameter as substantially avoids direct entrance of the ignition source into the offgas exhaust port 524, namely, about 8 mm.

In this embodiment, since the diffusion plate 530 is thus provided, gas discharged from the offgas exhaust port 524 hits the diffusion plate 530, is diffused in the radial direction of the opening of the offgas exhaust port 524, spreads all over, and is mixed with the atmosphere. That is, the gas is discharged to the atmosphere from the end opening of the gas flow passage while being diffused in the radial direction of the opening. Because the exhaust gas (hydrogen-off gas) that has thus been discharged and diffused all over more often comes into contact with air surrounding the end of the oxygen-off gas exhaust flow passage 503, the process of dilution of the exhaust gas (hydrogen-off gas) proceeds correspondingly. Therefore, it is possible to avoid a situation in which gas continues to be discharged while it still exhibits a high concentration of hydrogen. It is possible to reduce the concentration of hydrogen smoothly also at the location from which gas is discharged (at the end of the flow passage). As a result, in addition to the effect of dilution by the hydrogen diluter 424 and dilution based on mergence of the downstream flow passage 407a, it becomes possible to more reliably reduce the concentration of hydrogen and enhance the reliability in avoiding ignition.

This embodiment is designed such that the oxygen-off gas exhaust flow passage 503 is made from stainless steel and has a diameter of about 40 mm and that the diffusion plate 530 having a diameter of about 100 to 150 mm is spaced from the end of the exhaust flow passage by about 30 to 50 mm. Such a diffusion member can be designed in many different ways. For instance, the diffusion member may face the end of the flow passage or be provided in the opening at the end of the flow passage which has been widened like a trumpet.

The porous protector 536 (shield member) is disposed in such a manner as to cover the offgas exhaust port 524 and the diffusion plate 530. This shield member allows penetration of gases flowing from the end of the flow passage and is spaced from the offgas exhaust port 524 or the diffusion plate 530 by the aforementioned distance, thus making it possible to prevent direct entrance of the ignition source into the offgas exhaust port 524. Therefore, in addition to the aforementioned effect of reduction of the concentration of hydrogen by the hydrogen diluter 424 or the like, the reliability in avoiding ignition of exhaust gas (hydrogen-off gas) flowing from the offgas exhaust port 524 can further be enhanced. Besides, although a stone or the like hit by a tire strikes the protector 536, it does not reach the offgas exhaust port 524 or the diffusion plate 530. Thus, it is possible to prevent the flow passage from being damaged by a flying stone or the like.

Although the aforementioned embodiment employs both the diffusion plate 530 and the protector 536, it may be designed to employ either the diffusion plate 530 or the protector 536. The protector 536 may be a mesh-type protector formed into a predetermined shape. This protector can also be attached to a bumper or the like. It is appropriate that the protector 536 be spaced from the end of the flow passage by such a distance that direct approach of the ignition source to the end opening can be avoided substantially without blocking gas from flowing from the end opening. Also, as long as direct approach of the ignition source to the end opening can be avoided substantially, the shield member may have any number of pores and any pore diameter.

The invention is not to be limited to the aforementioned embodiments and can be implemented in many different ways without departing from the spirit thereof.

In the aforementioned first and second embodiments, the invention is applied to the fuel cell system that employs the hydrogen-occluding alloy tank 200 or the high-pressure gas tank 300 as a hydrogen gas-supplying source. However, the invention is not to be limited thereto and can also be applied to a fuel cell system that employs a reformer for reforming raw fuel and producing hydrogen gas or the like as a hydrogen gas-supplying source.

In the aforementioned first and second embodiments, hydrogen-off gas discharged from the fuel cell 100 is returned to the main flow passage 401 so that hydrogen gas circulates. However, the invention is not to be limited to fuel cell systems of the type in which hydrogen gas circulates. The invention can also be applied to fuel cell systems of a type in which hydrogen-off gas discharged from the fuel cell 100 is directly discharged to the atmosphere instead of causing circulation of hydrogen gas.

It is also possible to adopt a construction in which the combustor 510 mentioned in the description of the second embodiment is disposed downstream of the location where the downstream flow passage 407a and the oxygen-off gas exhaust flow passage 503 mentioned in the description of the third embodiment merge with each other, and to achieve both reduction of the concentration of hydrogen based on the hydrogen diluter 424 and reduction of the concentration of hydrogen based on a catalytic reaction occurring in the combustor 510.

The third embodiment may also be designed such that the oxygen-off gas exhaust flow passage 503 merges with the relief flow passages 430, 409 at their ends or that the hydrogen diluter 424 is disposed in each of the relief flow passages 430, 409 so as to ensure that hydrogen gas (relief gas) is mixed and diluted with oxygen-off gas.

The diffusion plate 530 mentioned in the description of the third embodiment may also be disposed at the end of each of the relief flow passages 430, 409 so as to ensure that hydrogen gas discharged from the flow passages is diffused all over and diluted. The diffusion plate 530 may also be disposed at the end of the oxygen-off gas exhaust flow passage 503 mentioned in the descriptions of the first and second embodiments.

It is not indispensable that the diffusion plate 530 mentioned in the description of the third embodiment be disposed on the end side of the oxygen-off gas exhaust flow passage 503. The diffusion plate 530 may be disposed on the side of the vehicle body (e.g., on the side of the bumper, the body frame, the protector 536, or the like) in such a manner as to face the offgas exhaust port 524 of the oxygen-off gas exhaust flow passage 503. In the third embodiment, the hydrogen diluter 424 may have the mixing chamber 424a whose inner surface has a layer of the platinum catalyst 512 formed thereon. This construction makes it possible to mix hydrogen with oxygen-off gas and remove hydrogen according to a catalytic reaction simultaneously in the hydrogen diluter 424. Therefore, the concentration of hydrogen can be reduced reliably.

Figure 11:
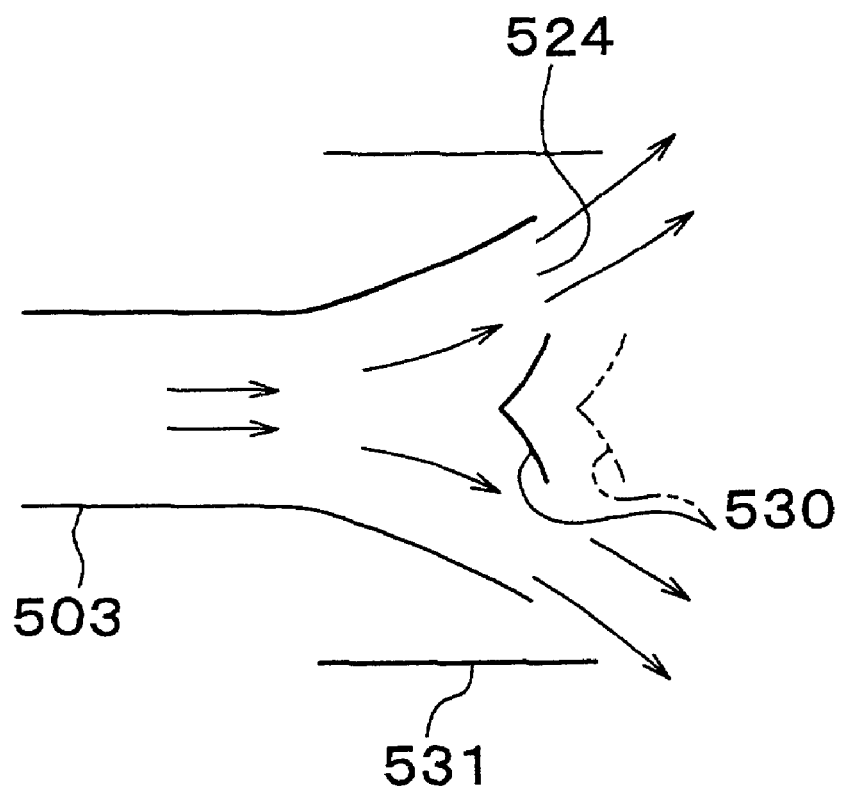
FIG. 11 is an illustrative view of an oxygen-off gas exhaust flow passage 503 and a diffusion plate 530 according to a modification example of the invention.

Although the diffusion plate 530 faces the offgas exhaust port 524 at the end of the oxygen-off gas exhaust flow passage 503 in the third embodiment, the third embodiment can also be modified as follows. FIG. 11 is an illustrative view illustrating the oxygen-off gas exhaust flow passage 503 and the diffusion plate 530 according to a modification example of the invention.

As shown in FIG. 11, the oxygen-off gas exhaust flow passage 503 has the offgas exhaust port 524 whose diameter is gradually enlarged like a trumpet. The diffusion plate 530 is in the shape of a cone or a truncated cone, and is disposed either inside or outside the opening of the offgas exhaust port 524. This construction also makes it possible to reduce the concentration of hydrogen smoothly and dilute exhaust gas (hydrogen-off gas) by diffusing exhaust gas all over. In this case, since the diameter of the offgas exhaust port 524 is gradually enlarged like a trumpet, gas can be diffused more widely. If a tubular body 531 is disposed outside the opening edge of the offgas exhaust port 524 as shown in FIG. 11, ambient atmosphere flowing from a space between the tubular body 531 and the opening edge of the offgas exhaust port 524 can mingle with exhaust gas flowing from the offgas exhaust port 524. Thus, exhaust gas is forced to contact the atmosphere. This is desirable because the process of diluting hydrogen proceeds correspondingly.

In the third embodiment, oxygen-off gas is introduced into the hydrogen diluter 424 through the flow passage branching off from the oxygen-off gas exhaust flow passage 503 as shown in FIG. 7. However, it is also possible to forcibly introduce oxygen-off gas using a pump or the like. This is desirable because the process of diluting hydrogen-off gas in the hydrogen diluter 424 is forced to proceed.

Figure 12:
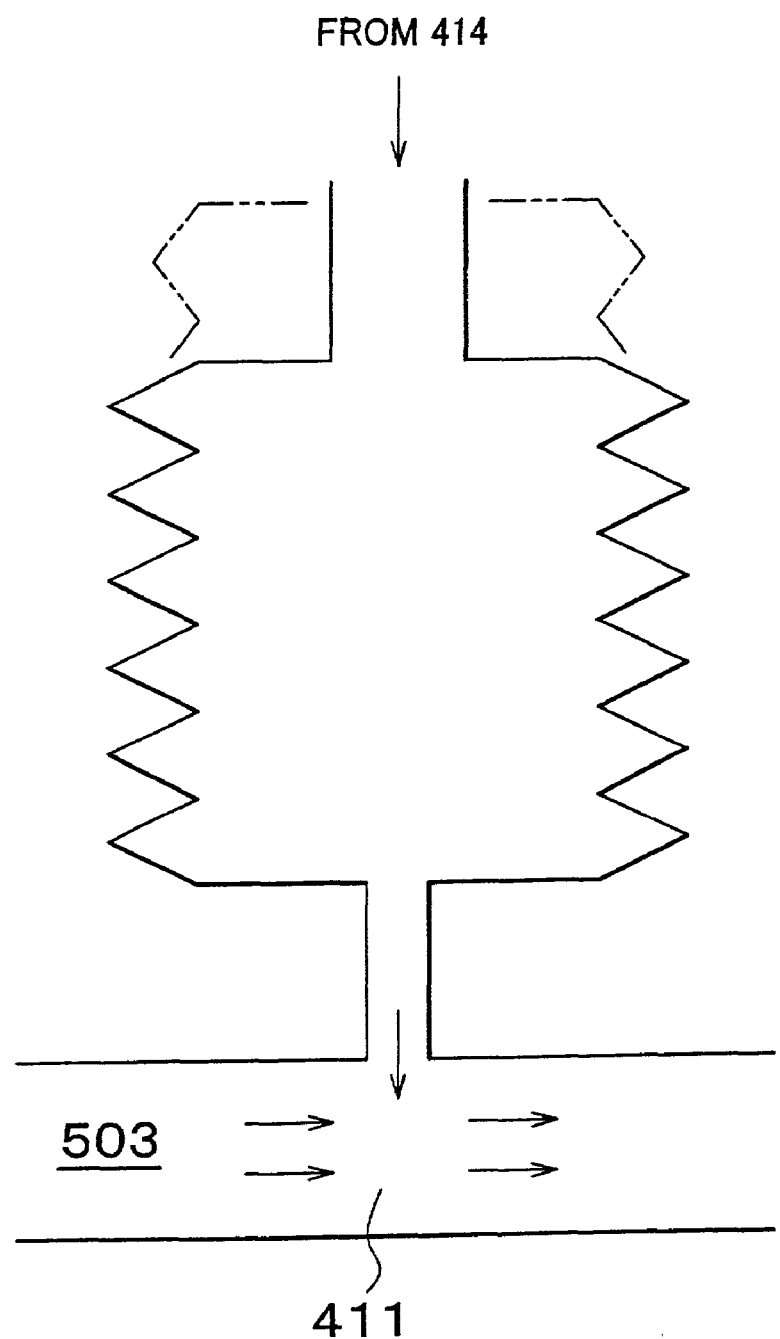
FIG. 12 is an illustrative view of a buffer 413 according to the modification example of the invention.

Furthermore, the buffer 413 of the first embodiment can also be modified as follows. FIG. 12 is an illustrative view of the buffer 413 according to a modification example of the invention. As shown in FIG. 12, the buffer 413 of this modification example has a bellows-like side wall. The bellows-like side wall of the buffer 413 is normally contracted. If this bellows-like side wall is expanded, it returns to its original shape because of its own elastic force. Thus, if hydrogen-off gas flowing from the shut valve 414 flows into the buffer 413 thus constructed (hydrogen-off gas intermittently flows into the buffer 413 depending on the on-off state of the valve), the gas flowing into the buffer 413 expands its bellows-like side wall and increases its volume as indicated by an alternate long and two short dashes line in FIG. 12, thus allowing hydrogen-off gas to stay therein. As the buffer 413 assumes its original shape due to the elastic force, it delivers hydrogen-off gas staying therein to the downstream mixing portion 411. Therefore, hydrogen-off gas can be diluted with oxygen-off gas reliably.

Although this bellows-like buffer 413 returns to its original shape due to its own elastic force, it may also be designed to return to its original shape with the aid of a spring, an actuator, or the like.

What is claimed is:

1. An onboard fuel cell system comprising:
    a fuel cell which may be supplied with hydrogen gas and oxidative gas, which is able to generate electric power using the hydrogen gas and the oxidative gas, and which is able to discharge hydrogen-off gas and oxygen-off gas that have been consumed;
    a first flow passage which leads to a hydrogen-off gas exhaust port of the fuel cell and through which the discharged hydrogen-off gas can flow;
    a second flow passage which leads to an oxygen-off gas exhaust port of the fuel cell and through which the discharged oxygen-off gas can flow;
    a mixing portion which is connected to receive the discharged hydrogen-off gas and the discharged oxygen-off gas from the first and second flow passages respectively and in which the oxygen-off gas may be mixed with the hydrogen-off gas;
    a third flow passage which leads from the mixing portion and through which the mixed gases can flow so that the hydrogen-off gas is discharged to the atmosphere;
    a valve which is disposed in the first flow passage; and
    a control portion programmed to control the valve to open and close the valve to allow or block flow of the hydrogen-off gas to the mixing portion and thereby control flow of hydrogen-off gas which is mixed with the oxygen-off gas in the mixing portion;
    wherein the control portion is programmed to control feeding of hydrogen-off gas to the mixing portion so that a proportion of hydrogen-off gas fed to the mixing portion is sufficiently diluted in the mixing portion such that a mixture of the hydrogen-off gas and the oxygen-off gas in the mixing portion avoids ignition, the mixture subsequently exiting the mixing portion.

2. The onboard fuel cell system according to claim 1, wherein
    the mixing portion comprises an oxygen-off gas-introducing branch flow passage which branches off from the second flow passage to introduce the oxygen-off gas from the second flow passage in a shunted manner and a mixing chamber to which the oxygen-off gas-introducing branch flow passage and the first flow passage lead and in which the hydrogen-off gas and the oxygen-off gas may be mixed with each other and which has such an enlarged volume that the mixed gases can flow into the third flow passage, and
    the second flow passage merges with the third flow passage downstream of a location where the second flow passage branches off from the oxygen-off gas-introducing branch flow passage.

3. The onboard fuel cell system according to claim 2, wherein a pressure-loss member for causing a pressure loss of a fluid flowing through the second flow passage is disposed in the second flow passage between the location where the second flow passage branches off from the oxygen-off gas-introducing branch flow passage and a location where the second flow passage merges with the third flow passage.

4. The onboard fuel cell system according to claim 3, wherein the pressure-loss member is a muffler.

5. The onboard fuel cell system according to claim 1, wherein the control portion comprises means for opening and closing the valve at intervals of a relatively short period when delivering the discharged oxygen-off gas to the mixing portion.

6. The onboard fuel cell system according to claim 1, further comprising:
a flow rate-reducing portion, including a buffer, which is disposed in the first flow passage between the valve and the mixing portion, and which reduces the flow rate of the hydrogen-off gas flowing from the valve to deliver a reduced flow rate of the hydrogen-off gas to the mixing portion such that concentration of hydrogen after passing through the mixing portion is reduced to the possibility of ignition.

7. The onboard fuel cell system according to claim 1, wherein the control portion comprises means for opening the valve if the concentration of hydrogen in the discharged hydrogen-off gas drops below a reference concentration.

8. The onboard fuel cell system according to claim 1, wherein a diffusion member for diffusing gas flowing out from an end opening of the third flow passage in the radial direction of the opening is disposed at the end of the third flow passage.

9. The onboard fuel cell system according to claim 8, wherein a shield member is disposed at the end of the third flow passage in such a manner as to cover the end while being spaced therefrom by a predetermined distance, and the shield member has at least one pore whose diameter is equal to or greater than a predetermined diameter.

10. The onboard fuel cell system according to claim 9, wherein the shield member is either meshed or punched porously.

11. The onboard fuel cell system according to claim 1, further comprising:
a fourth flow passage which leads to an oxidative gas-supplying port of the fuel cell and through which the supplied oxidative gas can flow; and
a water-vapor exchanger in which water vapor can be exchanged between oxygen gas supplied to the fuel cell via the fourth flow passage and oxygen-off gas discharged from the oxidative gas exhaust port of the fuel cell via the second flow passage.

12. The onboard fuel cell system according to claim 1, wherein said mixing portion has larger diameter than that of said first and second flow passages.

13. The onboard fuel cell system according to claim 12, wherein said mixing portion has larger volume per unit length than said first and second flow passages.

14. The onboard fuel cell system according to claim 12, wherein said mixing portion has a zig-zag shape through which the mixed gases can flow.

15. The onboard fuel cell system according to claim 12, wherein said mixing portion has a shield plate which partitions the mixing portion to provide said zig-zag shape.

16. The onboard fuel cell system according to claim 12, further comprising a catalyst in said mixing portion.

17. The fuel cell system according to claim 6, wherein the flow-rate reducing portion has an inlet port and an outlet port, wherein a diameter of the outlet port is smaller than that of the inlet port.

18. The fuel cell system according to claim 17, wherein a portion of the flow reducing portion between the inlet port and the outlet port has a volume per unit length greater than that of the inlet port or the outlet port.

19. The fuel cell system according to claim 17, wherein the flow reducing portion has a variable volume.

20. The onboard fuel cell system according to claim 1, further comprising:
a hydrogen gas-supplying source which supplies hydrogen gas;
a fourth flow passage which leads to a hydrogen gas-supplying port of the fuel cell and through which the supplied hydrogen gas flows;
a fifth flow passage which branches off from the fourth flow passage and discharges the hydrogen gas flowing in the fourth flow passage to the atmosphere via a relief valve; and
a mixing portion which is disposed downstream of the relief valve in the fifth flow passage, and which leads to the second flow passage and which mixes the oxygen-off gas with the hydrogen-off gas.

21. The onboard fuel cell system according to claim 1, further comprising:
a hydrogen gas-supplying source which supplies hydrogen gas;
a fourth flow passage which leads to a hydrogen gas-supplying port of the fuel cell and through which the supplied hydrogen gas flows;
a fifth flow passage which branches off from the fourth flow passage and discharges the hydrogen gas flowing in the fourth flow passage to the atmosphere via a relief valve; and
a hydrogen diluter which is disposed downstream of the relief valve in the fifth flow passage, and which reduces the concentration of the hydrogen.

22. The onboard fuel system according to claim 21, wherein catalyst is provided in the hydrogen diluter.

23. The onboard fuel cell system according to claim 1, further comprising:
a hydrogen gas-supplying source which supplies hydrogen gas;
a fourth flow passage which leads to a hydrogen gas-supplying port of the fuel cell and through which the supplied hydrogen gas flows;
a fifth flow passage which branches off from the fourth flow passage and discharges the hydrogen gas flowing in the fourth flow passage to the atmosphere via a relief valve; and
a catalyst reaction portion which is disposed downstream of the relief valve in the fifth flow passage, which causes hydrogen gas with oxygen to react with each other with the aid of a catalyst, and which reduces the concentration of hydrogen.

24. An onboard fuel cell system comprising:
a fuel cell which may be supplied with hydrogen gas and oxidative gas, which is able to generate electric power using the hydrogen gas and the oxidative gas, and which is able to discharge hydrogen-off gas and oxygen-off gas that have been consumed;
a first flow passage which leads to a hydrogen-off gas exhaust port of the fuel cell and through which the discharged hydrogen-off gas can flow;

a second flow passage which leads to an oxygen-off gas exhaust port of the fuel cell and through which the discharged oxygen-off gas can flow;

a mixing portion which is connected to receive the discharged hydrogen-off gas and the discharged oxygen-off gas from the first and second flow passages respectively and in which the oxygen-off gas may be mixed with the hydrogen-off gas;

a third flow passage which leads from the mixing portion and through which the mixed gases can flow so that the hydrogen-off gas may be discharged to the atmosphere;

a valve which is disposed in the first flow passage;

a hydrogen gas-supplying source for supplying hydrogen gas;

a fourth flow passage which leads to a hydrogen gas-supplying port of the fuel cell and through which the supplied hydrogen gas can flow;

a fifth flow passage which connects a first location in the first flow passage between the exhaust port of the fuel cell and the valve with a second location in the fourth flow passage and through which the hydrogen-off gas discharged from the fuel cell can flow to be returned to the fourth flow passage, wherein the valve is downstream of the first location of the first flow passage and hydrogen-off gas which passes through the valve exits the onboard fuel cell system without further passing through the fuel cell; and a control portion, programmed to control a proportion of hydrogen-off gas fed to the mixing portion so that hydrogen-off gas fed to the mixing portion is sufficiently diluted in the mixing portion such that a mixture of the hydrogen-off gas and the oxygen-off gas in the mixing portion avoids ignition, the mixture subsequently exiting the mixing portion.

25. The onboard fuel cell system according to claim 24, wherein
the hydrogen gas-supplying source contains a hydrogen gas-occluding alloy capable of occluding and discharging the hydrogen gas.

26. The onboard fuel cell system according to claim 25, further comprising:
a pump which is disposed in the fifth flow passage and by which the hydrogen-off gas discharged from the fuel cell may be discharged to the fourth flow passage; and
a sixth flow passage through which hydrogen gas can flow from the hydrogen gas-occluding alloy to the pump,
wherein hydrogen gas delivered from the hydrogen gas-occluding alloy is supplied to the fuel cell via the pump if the hydrogen gas-occluding alloy is at a low temperature.

27. The onboard fuel cell system according to claim 26, further comprising:
a seventh flow passage which leads to an oxidative gas-supplying port of the fuel cell and through which the supplied oxidative gas can flow;
a flow rate-changing portion which is disposed in the second flow passage or the seventh flow passage and which can change the flow rate of the discharged oxygen-off gas; and
a control portion adapted to control the valve and the flow rate-changing portion,
wherein the control portion can increase the flow rate of the discharged oxygen-off gas from a predetermined flow rate by means of the flow rate-changing portion at the same time as opening the valve.

28. The onboard fuel cell system according to claim 26, further comprising:
a seventh flow passage which leads to an oxidative gas-supplying port of the fuel cell and through which the supplied oxidative gas can flow;
a flow rate-changing portion which is disposed in the second flow passage or the seventh flow passage and which can change the flow rate of the discharged oxygen-off gas; and
a control portion which controls the valve and the flow rate-changing portion,
wherein the control portion opens the valve if the flow rate of the discharged oxygen-off gas is higher than a predetermined flow rate.

29. An onboard fuel cell system comprising:
a fuel cell which may be supplied with hydrogen gas and oxidative gas, which is able to generate electric power using the hydrogen gas and the oxidative gas, and which is able to discharge hydrogen-off gas and oxygen-off gas that have been consumed;
a first flow passage which leads to a hydrogen-off gas exhaust port of the fuel cell and through which the discharged hydrogen-off gas can flow;
a second flow passage which leads to an oxygen-off gas exhaust port of the fuel cell and through which the discharged oxygen-off gas can flow;
a mixing portion which is connected to receive the discharged hydrogen-off gas and the discharged oxygen-off gas from the first and second flow passages respectively and in which the oxygen-off gas may be mixed with the hydrogen-off gas;
a third flow passage which leads from the mixing portion and through which the mixed gases can flow so that the hydrogen-off gas may be discharged to the atmosphere;
a valve which is disposed in the first flow passage and which may be opened or closed so that the hydrogen-off gas is allowed to flow into or is blocked from flowing into the mixing portion;
a hydrogen gas-supplying source for supplying hydrogen gas;
a fourth flow passage which leads to a hydrogen gas-supplying port of the fuel cell and through which the supplied hydrogen gas can flow;
a fifth flow passage which connects a first location in the first flow passage between the exhaust port of the fuel cell and the valve with a second location in the fourth flow passage and through which the hydrogen-off gas discharged from the fuel cell can flow to be returned to the fourth flow passage, whereby the hydrogen-off gas discharged from the fuel cell may circulate back to the fuel cell,
wherein the valve is downstream of the first location of the first flow passage and hydrogen-off gas which flows through the valve when the valve is opened does not circulate back to the fuel cell; and
a control portion programmed to control opening and closing of said valve, wherein said control portion comprises means for opening the valve if the concentration of hydrogen in the discharged hydrogen-off gas drops below a reference concentration such that hydrogen-off gas passes through the valve and exits the onboard fuel cell system in response to a determination that the concentration of hydrogen in the discharged hydrogen-off gas is below the reference concentration.

30. An onboard fuel cell system comprising:
a fuel cell which may be supplied with hydrogen gas and oxidative gas, which is able to generate electric power using the hydrogen gas and the oxidative gas, and which is able to discharge hydrogen-off gas and oxidative-off gas that have been consumed;

a circulation flow passage which leads from a hydrogen-off gas exhaust port of the fuel cell to a flow passage connected to a hydrogen gas-supplying port of the fuel cell;

a first flow passage connected to the circulation flow passage and through which the discharged hydrogen-off gas can flow;

a second flow passage which leads to an oxidative-off gas exhaust port of the fuel cell and through which the discharged oxidative-off gas can flow;

a mixing portion which is connected to receive only the discharged hydrogen-off gas and the discharged oxidative-off gas from the first and second flow passages respectively and in which only the oxidative-off gas may be mixed with the hydrogen-off gas;

a third flow passage which leads from the mixing portion and through which the mixed gases containing only hydrogen-off gas and oxidative-off gas can flow so that the hydrogen-off gas may be discharged to the atmosphere;

a valve which is disposed in the first flow passage and which may be opened or closed so that the hydrogen-off gas is allowed to flow into or is blocked from flowing into the mixing portion; and a control portion programmed to control opening and closing of said valve, wherein hydrogen-off gas which passes through the valve exits the system without further passing through the fuel cell, and wherein the control portion is programmed to control a proportion of hydrogen-off gas fed to the mixing portion so that hydrogen-off gas fed to the mixing portion is sufficiently diluted in the mixing portion such that a mixture of the hydrogen-off gas and the oxygen-off gas in the mixing portion avoids ignition, the mixture subsequently exiting the mixing portion.

31. An onboard fuel cell system comprising:

a fuel cell which may be supplied with hydrogen gas and oxidative gas, which is able to generate electric power using the hydrogen gas and the oxidative gas, and which is able to discharge hydrogen-off gas and oxidative-off gas that have been consumed;

a circulation flow passage which leads from a hydrogen-off gas exhaust port of the fuel cell to a flow passage connected to a hydrogen gas-supplying port of the fuel cell;

a first flow passage connected to the circulation flow passage and through which the discharged hydrogen-off gas can flow;

a second flow passage which leads to an oxidative-off gas exhaust port of the fuel cell and through which the discharged oxidative-off gas can flow;

a mixing portion which is connected to receive the discharged hydrogen-off gas and the discharged oxidative-off gas from the first and second flow passages respectively and in which the oxidative-off gas may be mixed with the hydrogen-off gas;

a third flow passage which leads from the mixing portion and through which the mixed gases can flow so that the hydrogen-off gas may be discharged to the atmosphere;

a valve which is disposed in the first flow passage, wherein hydrogen-off gas passes through said valve and toward the mixing portion when said valve is in an opened position and wherein hydrogen-off gas which passes through the valve exits the onboard fuel cell system without further passing through the fuel cell;

wherein the mixing portion is connected to receive only the discharged hydrogen-off gas and the discharged oxidative-off gas from the first and second flow passages respectively a control portion programmed to control opening and closing of said valve, wherein said control portion comprises means for opening the valve if the concentration of hydrogen in the discharged hydrogen-off gas drops below a reference concentration such that hydrogen-off gas passes through the valve and exits the onboard fuel cell system in response to a determination that the concentration of hydrogen in the discharged hydrogen-off gas is below the reference concentration.

32. The onboard fuel cell system according to claim 1, wherein the control portion controls the valve to open or close according to an elapsed time.

33. The onboard fuel cell system according to claim 1, further including a timer, and wherein said control portion controls said valve based on said timer.

34. The onboard fuel cell system according to claim 1, wherein the control portion controls opening of the valve such that the valve is not open for longer than a predetermined time.

35. The onboard fuel cell system according to claim 34, wherein the predetermined time is equal to or less than one second.

36. The onboard fuel cell system according to claim 1, wherein the control portion controls the valve such that it is not open for greater than a predetermined amount of time.

37. The onboard fuel cell system according to claim 1, wherein the control portion increases a flow of oxygen-off gas to the mixing portion such that an increased oxygen-off gas flow is provided when the valve is open.

38. The onboard fuel cell system according to claim 1, wherein the oxygen-off gas is fed to the mixing portion with a compressor, and wherein the control portion opens the valve when an output of the compressor is higher than a predetermined value.

39. The onboard fuel cell system according to claim 1, wherein the control portion repeatedly opens and closes the valve until a predetermined time has elapsed.

40. The onboard fuel cell system according to claim 1, wherein a mixture exiting the mixing portion has a reduced possibility of ignition by at least one of the following:

(a) the control portion controls opening of the valve such that the valve is not open for longer than a predetermined time;

(b) the control portion increases a flow of oxygen-off gas to the mixing portion such that an increased oxygen-off gas flow is provided when the valve is open;

(c) the oxygen-off gas is fed to the mixing portion with a compressor, and the control portion opens the valve in response to a determination that an output of the compressor is higher than a predetermined valve; or (d) a buffer is provided in the first flow passage to reduce a flow rate of hydrogen-off gas to the mixing portion.

41. The onboard fuel cell system according to claim 1, wherein the system includes at least one of a timer or a hydrogen concentration sensor, and wherein the control portion controls the valve based on the at least one of the timer or the hydrogen concentration sensor.

* * * * *